United States Patent
Iyer et al.

(10) Patent No.: US 11,423,375 B2
(45) Date of Patent: Aug. 23, 2022

(54) SYSTEMS AND METHODS FOR BILL PAYMENT USING TRANSACTION CARDS WITHIN A FINANCIAL INSTITUTION PAYMENT PLATFORM

(71) Applicant: Mastercard International Incorporated, Purchase, NY (US)

(72) Inventors: Sriram Iyer, Ardsley, NY (US); Gaurav Khillan, Edison, NY (US); Ryan Francis, Wilton, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/084,208

(22) Filed: Oct. 29, 2020

(65) Prior Publication Data
US 2021/0133705 A1 May 6, 2021

Related U.S. Application Data

(60) Provisional application No. 62/928,171, filed on Oct. 30, 2019.

(51) Int. Cl.
*G06Q 20/10* (2012.01)
*G06Q 40/02* (2012.01)
(Continued)

(52) U.S. Cl.
CPC .......... *G06Q 20/102* (2013.01); *G06Q 20/02* (2013.01); *G06Q 20/108* (2013.01);
(Continued)

(58) Field of Classification Search
CPC ...... G06Q 20/102; G06Q 40/12; G06Q 20/02; G06Q 20/108; G06Q 20/341;
(Continued)

(56) References Cited

U.S. PATENT DOCUMENTS 6,039,245 A * 3/2000 Symonds ............. G06Q 20/202
235/379
7,899,742 B2 3/2011 Benkert et al.
(Continued)

OTHER PUBLICATIONS

Parker, Craig, and Paula Swatman. "Electronic payment systems." (2002). (Year: 2002).*
(Continued)

*Primary Examiner* — Asfand M Sheikh
(74) *Attorney, Agent, or Firm* — Armstrong Teasdale LLP

(57) ABSTRACT

Described herein are card-based bill payment systems and methods enabling bill payment using a transaction card within a consumer financial institution (CFI) payment platform and enabling real-time payment confirmation messaging is provided. The bill payment system includes a bill pay exchange (BPX) computing system that receives a payment initiation message from a CFI, the payment initiation message including tokenized payment credentials associated with a transaction card used to initiate a bill payment transaction with the CFI, a bill payment amount, and a biller identifier. The BPX computing system also identifies a biller service provider (BSP) associated with the biller, and transmit the payment initiation message to the BSP to initiate authorization of the bill payment transaction. The bill payment system further includes a payment processing network associated with the BPX computing system and configured to implement authorization of the bill payment transaction according to a card-based transaction model.

22 Claims, 11 Drawing Sheets

(51) Int. Cl.

| | |
|---|---|
| *G06Q 40/04* | (2012.01) |
| *G06Q 20/34* | (2012.01) |
| *G06Q 40/00* | (2012.01) |
| *G06Q 20/40* | (2012.01) |
| *G06Q 20/38* | (2012.01) |
| *G06Q 30/04* | (2012.01) |
| *G06Q 20/02* | (2012.01) |

(52) U.S. Cl.
CPC ......... *G06Q 20/341* (2013.01); *G06Q 20/385* (2013.01); *G06Q 20/3821* (2013.01); *G06Q 20/4014* (2013.01); *G06Q 20/4097* (2013.01); *G06Q 30/04* (2013.01); *G06Q 40/02* (2013.01); *G06Q 40/04* (2013.01); *G06Q 40/12* (2013.12)

(58) Field of Classification Search
CPC ............. G06Q 20/3821; G06Q 20/385; G06Q 20/4014; G06Q 20/4097; G06Q 30/04; G06Q 40/02; G06Q 40/04
See application file for complete search history.

(56) References Cited

U.S. PATENT DOCUMENTS

| | | | |
|---|---|---|---|
| 8,452,703 | B2 | 5/2013 | O'Leary et al. |
| 8,660,950 | B2 | 2/2014 | MacKouse |
| 9,760,903 | B2 | 9/2017 | Lal et al. |
| 10,430,891 | B2 | 10/2019 | Collart |
| 10,803,432 | B1* | 10/2020 | Miles ...................... G06K 7/10 |
| 2001/0037291 | A1 | 11/2001 | Allen |
| 2003/0115141 | A1* | 6/2003 | Felix ...................... G06Q 40/02 705/40 |
| 2005/0192901 | A1 | 9/2005 | McCoy et al. |
| 2006/0206425 | A1 | 9/2006 | Sharma |
| 2006/0208064 | A1 | 9/2006 | Mendelovich et al. |
| 2007/0150414 | A1 | 6/2007 | Templeton |
| 2008/0027844 | A1 | 1/2008 | Little et al. |
| 2008/0052208 | A1* | 2/2008 | Neece .................... G06Q 20/14 705/35 |
| 2010/0161486 | A1 | 6/2010 | Liu et al. |
| 2010/0257612 | A1* | 10/2010 | McGuire ............... G06Q 20/383 726/26 |
| 2011/0276414 | A1* | 11/2011 | Subbarao ........... G06Q 30/0277 705/14.73 |
| 2012/0030047 | A1* | 2/2012 | Fuentes ............. G06Q 30/0601 705/26.1 |
| 2012/0136780 | A1 | 5/2012 | El-Awady et al. |
| 2013/0332344 | A1* | 12/2013 | Weber .................. G06Q 20/385 705/39 |
| 2013/0346302 | A1* | 12/2013 | Purves ................. G06Q 20/108 705/40 |
| 2014/0114860 | A1* | 4/2014 | Ozvat .................. G06Q 20/382 705/64 |
| 2014/0310177 | A1 | 10/2014 | Eliscu |
| 2015/0100495 | A1 | 4/2015 | Salama et al. |
| 2017/0221066 | A1* | 8/2017 | Ledford ............... G06Q 20/407 |
| 2017/0278174 | A1* | 9/2017 | Harrell ................. G06Q 20/401 |
| 2018/0114204 | A1* | 4/2018 | Rosano ................. G06Q 20/102 |
| 2019/0340590 | A1* | 11/2019 | Davey .................. G06Q 20/102 |
| 2019/0370768 | A1* | 12/2019 | Spector ................. G06Q 20/14 |
| 2020/0143341 | A1* | 5/2020 | Patni ..................... G06Q 20/08 |

OTHER PUBLICATIONS

Vazquez Torralba, Nadin. "Security Analysis of Mobile Payments: Direct Carrier Billing." (2017). (Year: 2017).*

* cited by examiner

SYSTEMS AND METHODS FOR BILL PAYMENT USING TRANSACTION CARDS WITHIN A FINANCIAL INSTITUTION PAYMENT PLATFORM

CROSS-REFERENCE TO RELATED APPLICATIONS

This application claims the benefit of priority to U.S. Provisional Patent Application No. 62/928,171, filed Oct. 30, 2019, the entire contents and disclosure of which are hereby incorporated by reference in their entirety.

BACKGROUND

This disclosure relates generally to the field of electronic bill payment and, more specifically, to electronic bill payment using transaction cards within a consumer financial institution (CFI) environment, such as within a CFI payment platform.

More and more consumers are conducting increasing amounts of business online, including paying their bills. Conventionally, consumers must navigate to a biller payment platform to pay each individual bill, assuming the biller provides such a service. In at least some cases, billers do not allow online payments. Where a consumer has received three bills from three respective merchants or "billers," the consumer must navigate to three websites (or software applications, where applicable) and complete three disparate bill-payment processes. Each process may require the consumer to re-enter their payment credentials, which can be tedious and frustrating to the consumer.

In at least some cases, a biller's payment platform may be provided and/or maintained by a biller service provider, which provides the interface through which the consumer enters their payment credentials. The biller service provider uses the consumer's payment credentials and the biller's credentials with their acquirer to initiate a transaction on behalf of the biller. Each biller payment platform may have varying levels of security, and may transmit or store the consumer's payment credentials. That is, the consumer's payment credentials may be vulnerable at various sources associated with each of the three billers in the event of a data breach at any of the billers or biller service providers.

Other bill payment systems allow a consumer to pay at least some bills through a payment platform associated with their own bank (a consumer financial institution or CFI). However, many current CFI-based payment platforms do not allow consumers to use payment cards (e.g., credit cards, debit cards) to pay bills; consumers may only pay bills directly through bank accounts (e.g., savings accounts, checking accounts). A consumer provides their account credentials in the CFI-based payment platform, and the CFI initiates a bill pay transaction with the biller. However, the bill pay transaction may not be initiated and/or completed in real time and may not include many of the other benefits that accompany making payments using payment cards. Frequently, such transactions are not completed for at least a day, which may cause the consumer to be late on one or more of their bills.

In other cases, CFI-based platforms that provide a card option to the consumer to pay their bills online may use "screen scraping" technology. This technology is a technical integration that captures log-in and/or payment credentials for a consumer's account or payment with a biller. The consumer' credentials are then provided to the biller website by that technology. Notably, this methodology may pose a security threat for the consumer's login credentials, because the credentials are exposed to this technology (which may be implemented by a third party). These methods are also unreliable, because the bill payments will fail if the consumer's credentials change or of the biller "cuts off" the requesting IP address of the "scraping" technology that attempts to capture and, later, input the consumer's credentials.

Therefore, there is a need for a bill payment system that enables the use of transaction cards, provides additional security and convenience over conventional bill payment at individual biller payment platforms, and is reliable, secure, efficient, and consistent.

BRIEF DESCRIPTION

In one aspect, a card-based bill payment system enabling bill payment using a transaction card within a consumer financial institution (CFI) payment platform is provided. The bill payment system includes a bill pay exchange (BPX) computing system configured to receive a payment initiation message from a CFI, the payment initiation message including tokenized payment credentials associated with a transaction card used by a user to initiate a bill payment transaction with the CFI, a bill payment amount, and a biller identifier (ID) identifying a biller associated with the bill payment transaction. The BPX computing system is further configured to identify a biller service provider (BSP) associated with the biller, and transmit the payment initiation message to the BSP to initiate authorization of the bill payment transaction. The bill payment system further includes a payment processing network associated with the BPX computing system and configured to implement authorization of the bill payment transaction according to a card-based transaction model, including transmitting an authorization request to and receiving an authorization response including an approval from an issuer of the transaction card.

In another aspect, a computer-implemented method for bill payment using a transaction card within a consumer financial institution (CFI) payment platform is provided. The method includes receiving, by a bill pay exchange (BPX) computing system, a payment initiation message from a CFI, the payment initiation message including tokenized payment credentials associated with a transaction card used by a user to initiate a bill payment transaction with the CFI, a bill payment amount, and a biller identifier (ID) identifying a biller associated with the bill payment transaction. The method also includes identifying, by the BPX computing system, a biller service provider (BSP) associated with the biller, and transmitting, by the BPX computing system, the payment initiation message to the BSP to initiate authorization of the bill payment transaction. The method further includes implementing, by a payment processing network associated with the BPX computing system, authorization of the bill payment transaction according to a card-based transaction model, including transmitting an authorization request to and receiving an authorization response including an approval from an issuer of the transaction card.

In a further aspect, at least one non-transitory computer-readable storage medium having stored thereon computer-executable instructions is provided. When the computer-executable instructions are executed by a processor of a bill pay exchange (BPX) computing system, the computer-executable instructions cause the processor of the BPX computing system to receive a payment initiation message from a CFI, the payment initiation message including tokenized payment credentials associated with a transaction card used by a user to initiate a bill payment transaction with the CFI, a bill payment amount, and a biller identifier (ID) identifying a biller associated with the bill payment transaction. The computer-executable instructions also cause the processor of the BPX computing system to identify a biller service provider (BSP) associated with the biller, and transmit the payment initiation message to the BSP to initiate authorization of the bill payment transaction. When the computer-executable instructions are executed by a processor of a payment processor associated with the BPX computing system, the computer-executable instructions cause the processor of the payment processor to implement authorization of the bill payment transaction according to a card-based transaction model, including transmitting an authorization request to and receiving an authorization response including an approval from an issuer of the transaction card.

BRIEF DESCRIPTION OF THE DRAWINGS

FIGS. 1-10 show example embodiments of the methods and systems described herein.

FIG. 1 is a schematic diagram illustrating an example card-based bill payment network for enabling bill payment using a transaction card within a consumer financial institution (CFI) environment, as well as an example bill-payment method implemented thereby, in accordance with the present disclosure.

FIG. 2 further illustrates the example bill-payment method implemented using the card-based bill payment network shown in FIG. 1.

FIG. 3 illustrates an example bill payment user interface within the CFI environment, in accordance with the present disclosure.

FIG. 4 depicts the card-based bill payment network shown in FIGS. 1 and 2 implementing initialization processes including a bill submission process and a biller directory sharing process.

FIG. 5 depicts an alternative example of a card-based bill payment network implementing a portion of the bill-payment method shown in FIG. 1.

FIG. 6 depicts another alternative example of a card-based bill payment network implementing a portion of the bill-payment method shown in FIG. 1.

FIG. 8 illustrates an example user computing device that may be used with the card-based bill payment network shown in FIG. 1.

FIG. 9 illustrates an example server computing device that may be used with the card-based bill payment network shown in FIG. 1.

FIG. 10 illustrates an example card-based bill-payment method that may be implemented using the card-based bill payment network shown in FIG. 1.

Like numbers in the Figures indicate the same or functionally similar components.

DETAILED DESCRIPTION

Figure 1:
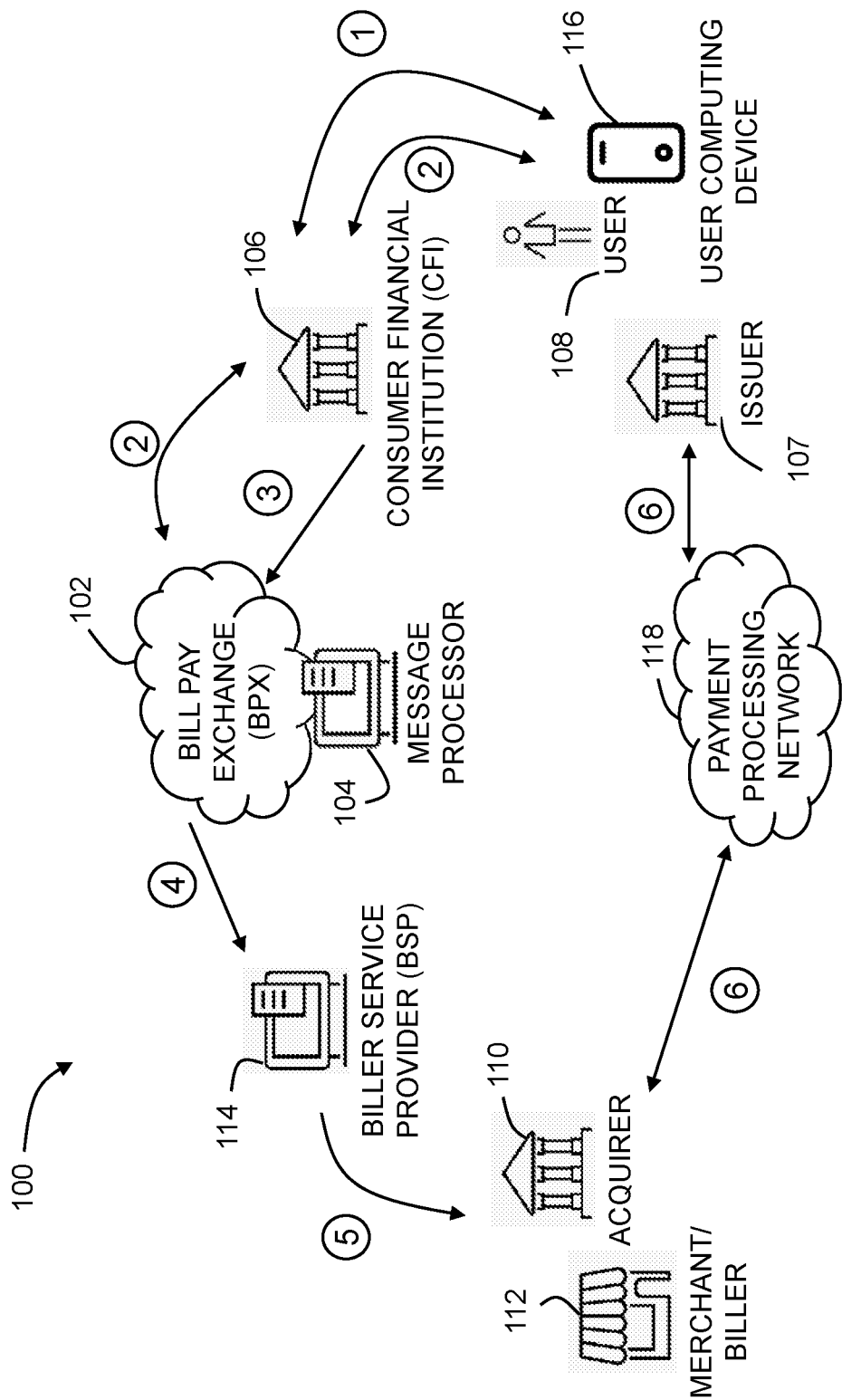

The present disclosure relates to a card-based bill payment computer system that combines the convenience of consumer financial institution (CFI) payment platforms with transaction card-based bill payments. In particular, a card-based bill payment network includes a bill pay exchange (BPX) computing system that functions as a card payment gateway, a real-time messaging system, and a software gateway between a CFI and a biller (or a biller service provider (BSP)) that enables card-based payment within a CFI payment platform. In this way, the BPX computing system facilitates the CFI payment platform being a source of payment data to the biller/BSP (rather than direct entry of payment data by a consumer at the biller/BSP payment platform), which was previously unavailable in conventional payment systems. The BPX computing system as a payment gateway also enables these card-based bill payments to be performed using the existing card-payment ecosystem (e.g., a four-party card-based transaction model using ISO 8583 and/or ISO 20022 messaging protocols), limiting infrastructure changes required to enable card-based bill payments while leveraging existing merchant-acquirer-issuer relationships.

The BPX computing system enables billers that accept transaction cards as payment options to have their bills paid by consumers within the CFI payment platform, which improves the consumer experience and provides a host of other benefits described more fully herein. Notably, the card-based bill payment network described herein is a new computing ecosystem that incorporates several electronic transaction processing computing assets—including the BPX computing system as a software gateway between the CFI payment platform and the biller/BSP, the BPX computing system as a payment gateway, and a biller directory defining biller information and preferences—that has been previously unavailable. Specifically, biller-side payment technology cannot provide all the functionality of the card-based bill payment network of the present disclosure, nor can previously known CFI-side payment technology.

Moreover, the card-based bill payment network described herein provides improved security over existing bill payment systems and methods, such as those described herein above. In particular, the card-based bill payment network, in leveraging the existing card-payment transaction processing network, incorporates the strong compliance and security standards thereof. In addition, by enabling the CFI payment platform as the source of payment data and user input, the security and authentication features common to CFI-side online banking—such as robust user authentication and Know Your Customer (KYC)—are provided as an additional layer of security to the card-based bill payments initiated from within these CFI-side payment environments. This system also eliminates the need for any storage of payment credentials (tokenized or otherwise) at billers/BSPs, which reduces the vulnerability of a user's payment credentials in the event of a data breach at billers/BSPs.

The technical problems addressed by this system include at least one of: (i) inability to initiate card-based bill payments from a CFI payment platform; (ii) lack of integration between CFI payment platforms and billers/BSPs; (iii) lack of real-time confirmation of payments being completed and accepted by billers; and (iv) time-consuming, inefficient, and potentially risky conventional bill payment at individual biller payment platforms.

The methods and systems described herein may be implemented using computer programming or engineering techniques including computer software, firmware, hardware, or any combination or subset thereof, wherein the technical effects may be achieved by: (a) receiving, by a bill pay exchange (BPX) computing system, a payment initiation message from a CFI, the payment initiation message including tokenized payment credentials associated with a transaction card used by a user to initiate a bill payment transaction with the CFI, a bill payment amount, and a biller identifier (ID) identifying a biller associated with the bill payment transaction, (b) identifying, by the BPX computing system, a biller service provider (BSP) associated with the biller, (c) transmitting, by the BPX computing system, the payment initiation message to the BSP to initiate authorization of the bill payment transaction, and (d) implementing, by a payment processing network associated with the BPX computing system, authorization of the bill payment transaction according to a card-based transaction model (e.g., a four-party card-based transaction model), including transmitting an authorization request to and receiving an authorization response including an approval from an issuer of the transaction card.

The resulting technical benefits achieved by this system include at least one of: (i) providing a software gateway between CFI payment platforms and billers/BSPs that enables card-based bill payments from a CFI payment platform; (ii) real-time payment confirmation messaging, enabling real-time payment reconciliation; (iii) efficient and secure bill payment services; (iv) enabling card-based bill payments through existing card-based transaction processing networks; (v) enhanced security of bill payments by using credit cards; (vi) increased user convenience in bill payment; (vii) enabling a user to leverage and use credit to pay bills; (viii) enabling a user to accrue rewards and/or points by using their credit card (or other loyalty card) to pay bills; (ix) bill consolidation into one location and interface; and (x) a single user authentication mechanism for all bill payment through the single location/interface. At least some of these technical benefits are achieved based on the unique location of the BPX computing system within the overall payment computing environment. Specifically, the association of the BPX computing system with the payment processing network, as described more fully herein, enables the BPX computing system to leverage existing connections and infrastructure between billers/BSPs and the payment processing ecosystem and add an access channel, via the BPX computing system, into these payment processing connections. The unique location of the BPX computing system also enables the processing of incoming real-time payment messages, to enable real-time payment processing as well as real-time confirmation messaging.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable payment card, such as a credit card, a debit card, a prepaid card, a charge card, a membership card, a promotional card, a frequent flyer card, an identification card, a gift card, a card associated with a specialized savings account (e.g., a health savings account (HSA) card), and/or any other payment device that may hold payment account information. Each type of payment device can be used as a method of payment for performing a transaction.

As used herein, the term "card scheme" refers generally to a payment processing networked linked to a payment/transaction card, of which banks (e.g., issuing banks) are members. Card schemes may include three- or four-party schemes, including, but not limited to, MASTERCARD, VISA, DISCOVER, AMERICAN EXPRESS, DINERS CLUB, UNIONPAY, JCB, UATP, and the like. In some embodiments of the present disclosure, MASTERCARD PAYMENT GATEWAY SERVICE (MPGS) provides the payment functionality described herein. More specifically, in one embodiment, it should be understood that the BPX computing device described herein may include the MPGS system and/or provide the services thereof. The BPX computing device may be implemented as a single computing device or using multiple linked/associated computing devices.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 2:
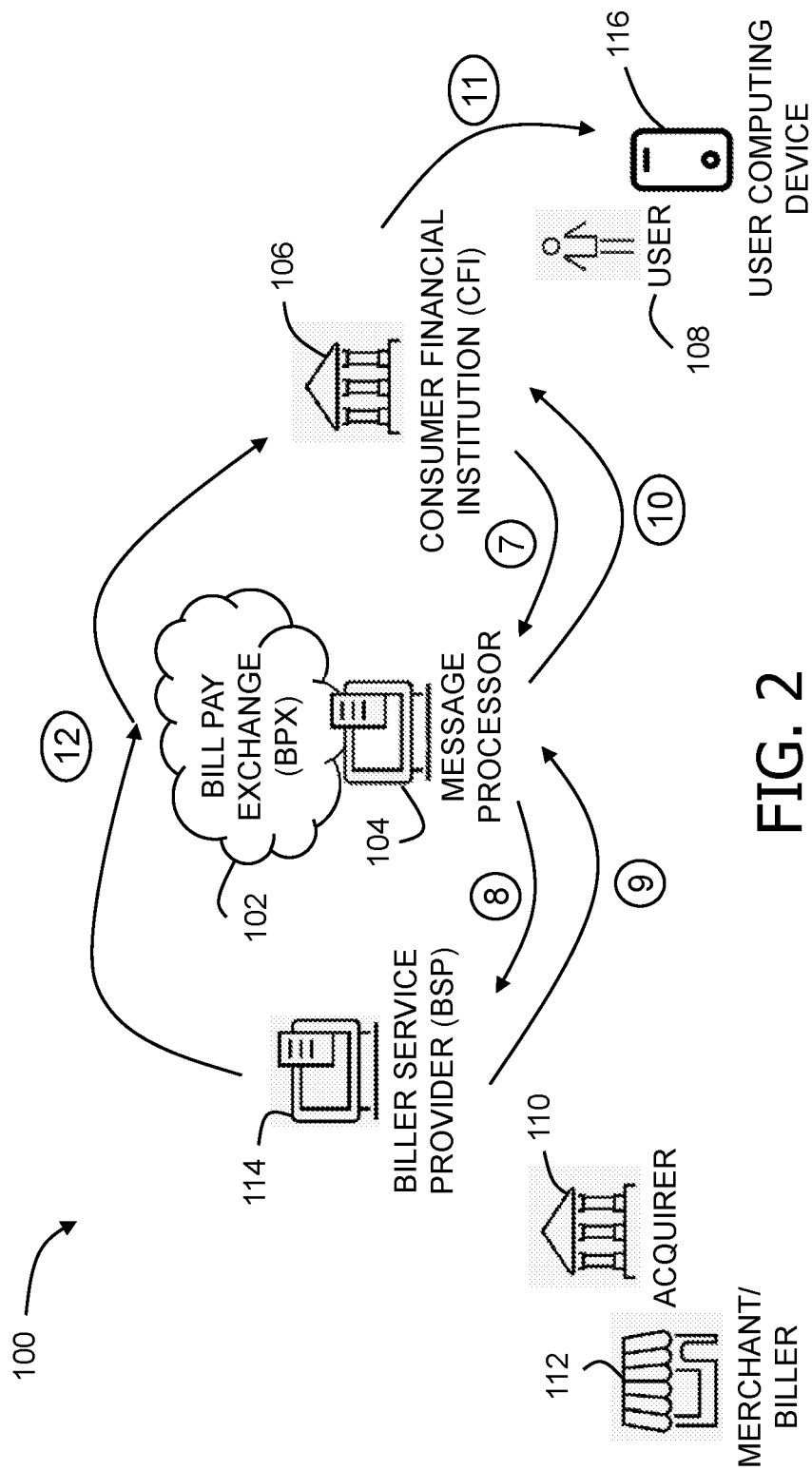

FIGS. 1 and 2 include a schematic diagram illustrating an example card-based bill payment network 100 for enabling bill payment using a transaction card within a consumer financial institution (CFI) environment, as well as an example bill-payment method implemented using card-based bill payment network 100.

In the illustrated embodiment, card-based bill payment network 100 includes a bill pay exchange (BPX) computing system 102, which facilitates at least a portion of the bill-payment method described further herein. BPX computing system 102 may include any suitable computing device(s), such as one or more server computing device(s), databases, cloud-based computing and/or storage systems, and/or any other device(s), token databases/vaults, and/or encryption mechanisms. BPX computing system 102 includes, in the example embodiment, a message processor 104 that facilitates real-time confirmation messaging between components of card-based bill payment network 100. As described further herein, "real-time confirmation messaging" refers to messaging between components of card-based bill payment network 100 that is separate from authorization or payment messaging but related thereto. "Real-time" refers to messaging that occurs without substantial delay, such as within seconds or minutes. "Real-time confirmation messaging," therefore, takes place within seconds or minutes of completed bill-payment transactions. Message processor 104 may be configured to receive, transmit, and/or generate messages according to the ISO 8583 and/or ISO 20022 messaging standard.

Card-based bill payment network 100 further includes a consumer financial institution or CFI 106, which may include an issuer bank 107 that issues a payment account or bank account to a consumer or user 108, as well an acquirer bank 110, which issues and maintains a payment account or bank account associated with a merchant or biller 112. Biller 112 represents any merchant to which user 108 may owe some payment amount. For example, a biller 112 may include a utility company (e.g., a gas company, electric company, water/sewer entity, trash company, etc.). As another example, biller 112 may include a merchant to which monthly or regular payment are owned, such as a mortgage payment to a lender or membership payments to a gym, or any other merchants, including those to which a one-time payment is owed (e.g., an auto mechanic, a doctor, an insurance company, etc.). Card-based bill payment network 100 further includes a biller service provider (BSP) 114 that provides biller direct services to billers 112. "Biller direct services" include bill payment environments associated with particular billers 112, such as bill payment environments accessed through websites and/or software apps associated with billers 112. BSPs 114, in some cases, enable users 108 to pay bills using transaction cards, but only provide such features for payment interfaces and environments specific to each biller 112. BSPs 114 also interact with payment monitoring systems associated with billers 112, such as enterprise resource planning (ERP) systems of billers 112.

CFI 106 may include the issuer financial institution (e.g., issuer bank 107), as well as one or more associated issuer processors that interface with BPX computing system 102 on behalf of CFI 106. In some embodiments, CFI 106 may not be an issuer 107 of a payment account of user 108 but may provide access to the payment account on behalf of issuer 107. CFI 106 provides a bill payment environment through which user 108 can pay one or more bills (and/or conduct other financial processes, such as viewing balances, performing transfers, and the like). The bill payment environment may include, for example, a (usually branded) web site or software app maintained by CFI 106. User 108 has one or more user computing devices 116 associated therewith. A user computing device 116 may include any device capable of accessing the Internet and the bill payment environment of CFI 106.

Card-based bill payment network 100 also includes a payment processing network 118, which is configured to process payment card transactions (e.g., bill payments). In the example embodiment, payment processing network 118 is associated with BPX computing system 102. More specifically, BPX computing system 102 and payment processing network 118 are the same entity, such that BPX computing system 102 may be described as providing a payment gateway for payment processing through payment processing network 118. In other embodiments, payment processing network 118 is not associated with BPX computing system 102. Payment processing network 118 may include one or more payment processor computing devices (e.g., MPGS computing devices) configured to implement the functionality of payment processing network 118 as described herein.

In the example embodiment, user 108 desires to pay a bill associated with biller 112. As described above, in conventional bill payment systems, a user may either: (a) visit a website or other payment interface associated with each biller that has issued the user a bill (e.g., enabled by a BSP associated with the biller), and pay each such bill on the biller's payment interface, or (b) access their CFI's bill payment interface, identify a biller the user wishes to pay, and use a bank account (e.g., a checking or savings account issued by the CFI) to pay the bill issued by the biller. The disadvantages of these conventional systems are detailed above.

Figure 3:
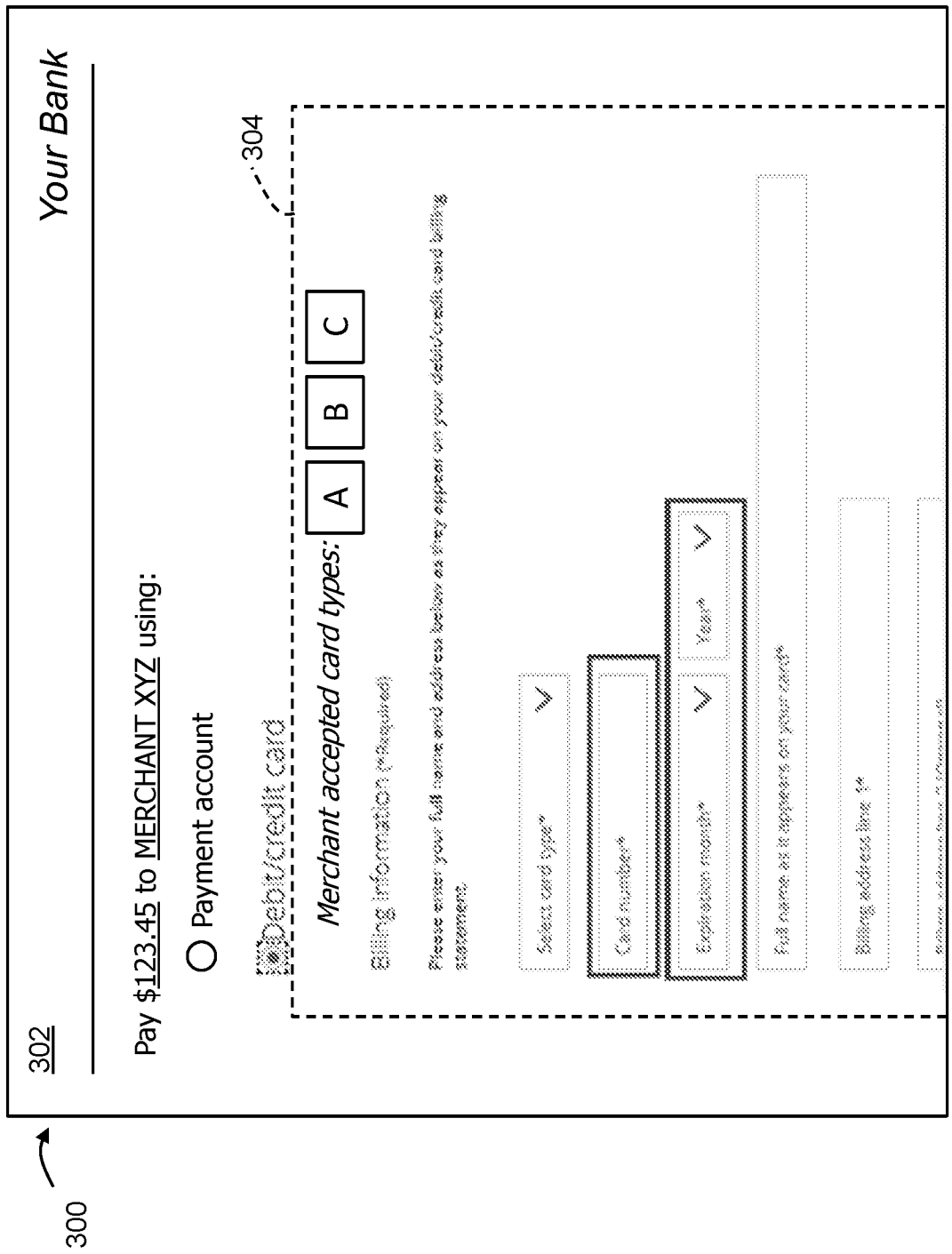

Returning to FIG. 1, in accordance with the present disclosure, user 108 uses their user computing device 116 to access the bill payment environment of CFI 106. FIG. 3 illustrates one example bill payment environment 300, embodied as a website or user interface of a software app executed on user computing device 116, and will be described in further detail below. In the example embodiment of FIG. 1, user 108 authenticates (1) into the CFI bill payment environment. For example, user 108 may provide a user name and password, a biometric identifier (e.g., a fingerprint or facial image), a PIN, a one-time pin or password generated by CFI 106 and transmitted to user computing device 116, and/or any other authentication information, according to the particular authentication procedures implemented by CFI 106.

User 108 selects a bill to pay—i.e., a bill issued by biller 112 (or by BSP 114 on behalf of biller 112). CFI 106 retrieves the bill selected by user, which includes bill data such as a billed amount (i.e., a total amount that biller 112 has billed user 108) and a biller identifier (ID) unique to biller 112. Based upon the biller ID, CFI 106 determines what payment options that particular biller 112 will accept (e.g., by accessing a biller directory, not shown in FIG. 1). For example, biller 112 may accept transaction cards but only transaction cards for certain card schemes (e.g., MASTERCARD and VISA but not AMERICAN EXPRESS). Other billers may not accept payment cards at all. It is contemplated that certain billers 112 may accept transaction cards as forms of payment but may issue a transaction fee for bills paid using a transaction card. Such a transaction fee may be issued and incorporated into a bill payment amount.

CFI 106 identifies the payment options accepted by biller 112 and prompts user 108 to select their preferred form of payment. In the example embodiment, user 108 selects an option to use a transaction card to initiate a payment of a bill issued by biller 112 (an option that is unavailable in conventional CFI bill payment environments).

User 108 enters their payment credentials (e.g., a transaction card number, name, expiration date, security code, billing address, and the like) into a payment form (e.g., a payment form 304, see FIG. 3), or the payment credentials may be selected from previously stored (tokenized) payment credentials. In some embodiments, such as where user 108 has selected an option to pay their bill via a payment card, the payment form is provided or hosted by BPX computing system 102 and/or payment processing network 118 (e.g., as an embedded form, such as a JAVASCRIPT library). In such embodiments, data entered into the payment form may be transmitted directly to BPX computing system 102 (and/or payment processing network 118). In other embodiments, the payment form is provided by CFI 106, and CFI 106 is configured to transmit the payment information to BPX computing system 102 (and/or payment processing network 118). In some embodiments, user 108 also enters a bill payment amount into the payment form. In some such embodiments, the bill payment amount differs from the billed amount, such as where user 108 is making only a partial payment of the billed amount or a transaction fee is issued and added onto a billed amount. In other embodiments, the payment form may not enable user 108 to pay any amount other than the billed amount (e.g., a biller 112 may not accept partial payments).

Upon entry of the payment credentials, user 108 initiates (2) the bill payment transaction. CFI 106 receives the credentials via user computing device 116 and interfaces with BPX computing system 102 (and/or payment processing network 118) to tokenize the payment credentials as part of the transaction initiation (2). BPX computing system 102 (and/or payment processing network 118) tokenizes the payment credentials and returns the tokenized payment credentials to CFI 106. In some embodiments, CFI 106 stores the tokenized payment credentials in a database, such that the tokenized payment credentials are associated with user 108 and/or user computing device 116 and may be accessed at a later time (e.g., such that user 108 need not provide their (non-secured) payment credentials the next time they wish to pay a bill through CFI 106). In some embodiments, the tokenized payment credentials are issued as a "network token" (also referred to as an "issuer token"), which is provisioned by the token provider (e.g., BPX computing system 102) to the token requestor (e.g., CFI 106).

CFI 106 then transmits (3) a payment initiation message to BPX computing system 102. The payment initiation message includes the tokenized payment credentials, the bill payment amount, and the biller ID. In some embodiments, the payment initiation message also includes a user account ID of a user account with biller 112 and a bill ID, and, where applicable, any transaction flag and/or fee amount (which may be part of the bill payment amount or separate therefrom). The payment initiation message may include additional data elements, such as an indicator of whether the payment credentials are tokenized, a currency code, a BSP ID of BSP 114 associated with biller 112, a CFI ID of CFI 106 transmitting (3) the payment initiation message, a biller name, a transaction ID, and/or a time/date stamp. In some embodiments, CFI 106 automatically transmits (3) the payment initiation message upon receiving the tokenized payment credentials. In other embodiments, CFI 106 prompts user 108 to confirm payment, and only transmits (3) the payment initiation message to BPX computing system 102 after user 108 has confirmed payment.

BPX computing system 102 receives the payment initiation message and parses the payment initiation message for the biller ID, which identifies biller 112. BPX computing system 102 identifies BSP 114 associated with biller 112 and transmits (4) the payment initiation message to the identified BSP 114. In some embodiments, BPX computing system 102 transmits (4) the payment initiation message with the tokenized payment credentials, and subsequent payment processing, as described herein, proceeds with the tokenized payment credentials. In such embodiments, only tokenized payment credentials are passed to BSP 114 and/or biller 112 (e.g., as a network token), which enhances the security of the transaction. Specifically, no third party receives the user's (non-tokenized) payment credentials. Alternatively, BPX computing system 102 may de-tokenize the payment credentials before they are passed to BSP 114. In such embodiments, BPX computing system 102 may instruct BSP 114 to not store the payment credentials. These transactions may still be more secure than conventional transactions, in which a user's (non-tokenized) payment credentials are entered at and stored at one or more BSPs 114 (depending on how many bills are paid by user 108 and how many BSPs 114 handle those payments).

BSP 114 parses the payment initiation message for the biller ID of biller 112, with which BSP 114 has an existing relationship. Specifically, as described above, BSP 114 is configured to manage billing services for biller 112. BSP 114 initiates authorization (5) of the payment transaction with the biller's acquirer 110 according to its typical authorization processes.

The bill payment transaction is conducted or implemented (6) as a normal transaction card-based transaction thereafter, using a transaction processing model (e.g., a four-party card-based transaction model) involving acquirer 110, payment processing network 118, and issuer 107 of the transaction card used to initiate the bill payment transaction (which may be CFI 106 or another bank). Issuer 107 (which may include CFI 106) authorizes or declines the bill payment transaction according to its own authorization rules (e.g., based on whether the account is in good standing, has sufficient funds/credit, etc.). Issuer 107 (which may include CFI 106) may place a hold on funds in the bill payment amount for subsequent clearing and settlement.

In addition, in some embodiments, upon the bill payment transaction being authorized, BPX computing system 102 (and/or payment processing network 118) transmits a response message (e.g., via an API) representing a response to the payment initiation message. This response message may include, for example, a response code indicating the authorization status (e.g., authorized) of the transaction, an authorization ID, a retrieval reference number, and a time/date stamp.

Turning now to FIG. 2, card-based bill payment network 100 also implements a real-time confirmation messaging process that alerts all stakeholders to a bill payment transaction that the bill payment transaction has been completed. This messaging process occurs substantially immediately after (e.g., within seconds of) a bill payment transaction is approved or authorized by the issuer of the transaction card (e.g., issuer 107, shown in FIG. 1) used to initiate the bill payment transaction, which may include CFI 106.

In the example embodiment, where CFI 106 is the issuing bank, CFI 106 authorizes the bill payment transaction, and transmits (7) a payment confirmation message to BPX computing system 102 (e.g., to message processor 104). The payment confirmation message includes the bill payment amount, the biller ID, a user ID (e.g., a user account number or ID associated with the user's account with biller 112), and an indication that the bill payment transaction has been authorized. The payment confirmation message may also include the tokenized payment credentials used to complete the payment transaction, a network response code, a transaction time/date stamp, and/or a transaction ID associated with the bill payment transaction. The transaction ID may be a bill ID previously generated by biller 112 and/or BSP 114 and provided as part of the bill issued to user 108. Alternatively, CFI 106 may generate the transaction ID. Where CFI 106 is not the issuing bank, CFI 106 receives an indication of successful authorization (e.g., from issuer 107) and subsequently transmits (7) the payment confirmation message to BPX computing system 102. In either embodiment, BPX computing system 102 (e.g., message processor 104) receives the payment confirmation message and, based on the biller ID, forwards (8) the payment confirmation message to BSP 114.

Upon receiving the payment confirmation message, BSP 114 performs various processes related to its obligations to biller 112, such as tracking payment of bills and interfacing with ERP software to manage payments and cash flow. In particular, BSP 114 updates database(s) associated with biller 112 to indicate the bill issued to user 108 has been paid. BSP 114 may transmit a separate message (not shown) to biller 112 to indicate the bill issued to user 108 has been paid.

In addition, BSP 114 transmits (9) a confirmation receipt to BPX computing system 102 (e.g., message processor 104), the confirmation receipt including a biller reference number. The biller reference number is an identifier specific to biller 112 and the bill payment transaction, and can be used to identify the (completed) bill payment transaction at a subsequent date. BPX computing system 102 forwards (10) the confirmation receipt to CFI 106, which may provide (11) user 108 access to the confirmation receipt and/or biller reference number for the user's own records. The confirmation receipt indicates the bill issued to user 108 has been paid and that biller 112 has confirmed payment. That is, the confirmation receipt provides further confirmation (as compared to merely receiving a "payment authorized" message from CFI 106) to user 108 that the bill payment process is complete and the amount owed/paid to biller 112 has been paid in full.

Clearing, settlement, and/or reconciliation of the bill payment transaction proceed(s) in real-time or at a subsequent date. In some embodiments, BSP 114 posts the bill payment transaction and transmits (12) a post confirmation message to BPX computing system 102, the post confirmation message indicating that the bill payment transaction has posted. BPX computing system 102 then transmits (12) the post confirmation message to CFI 106. In some embodiments, transfer of funds between CFP 106 (and/or issuer 107 of the payment account associated with the transaction card used to initiate the bill payment transaction) and acquirer 110 may be performed as a real-time payment or as part of a batch ACH payment.

According to the present disclosure, card-based bill payment network 100 supplements the conventional source of bill payment data provided to a BSP 114 (e.g., user 108 providing their transaction card information directly to BSP 114 through the biller's website, or user 108 providing non-card payment account information to BSP 114 through CFI 106) with a more secure and more centralized system, specifically BPX computing system 102 that is configured to interface with CFI 106 as described above.

Card-based bill payment network 100 therefore represents a more efficient system from a user perspective, because users need not visit several separate biller websites to pay their bills, and they have the added convenience and safety that are inherent in using credit cards (or other transaction cards) rather than bank accounts. Moreover, card-based bill payment network 100 is more structurally efficient as well. Specifically, no existing relationship and/or direct communication between CFI 106 and BSP 114 (or biller 112/acquirer 110) is needed, as BPX computing system 102 provides the software gateway between these entities, which improves the security of the transaction and the efficiency in implementing transaction cards as a bill payment option. Accordingly, only BPX computing system 102 need interact with BSP 114—that is, only one relationship with BSP 114 needs to be formed, rather than forming hundreds of relationships between each BSP 114 and each CFI 106. In this way, billers 112 can expand their accepted payment options to include virtually any type of transaction card without requiring any infrastructure changes for CFI 106, acquirer 110, and/or BSP 114. Therefore, billers 112 have a great deal of control over the payment options they will accept, because BPX computing system 102 is inherently card type- and scheme-agnostic.

In addition, card-based bill payment network 100 provides enhanced security over other bill-payment methods, such as those described herein. In particular, bill payments are processed over payment processing network 118, which features robust security (e.g., tokenization), authentication, and fraud management functionality according to payment card processing security standards. Moreover, CFI 106 has integral security features, such as user authentication that occurs upon access or log-in to the payment platform of CFI 106, which adds an additional layer of security to any transaction initiated within the payment platform. CFI 106 may also enable enhanced payment features, including options for one-time bill payments, scheduled bill payments, auto-payments, and the like, and may enable use of a user's digital wallet and forms of payment therein.

Card-based bill payment network 100 provides benefits and advantages to each party thereto. For example, CFI 106 benefits include: (i) increased revenue generation by enabling additional card-based transaction through payment processing network 118; (ii) increased customer loyalty or "stickiness" due to improved customer bill-pay experience and increased time spent in the CFI's environment; and (iii) providing a competitive advantage over other banks that do not provide card-based bill payment functionality. Likewise, acquirer 110 may benefit from increased transaction traffic through payment processing network 118. Biller 112 benefits may include: (i) improved timeliness of consumer payments due to real-time completed payments as well as access to credit lines through the use of credit cards to pay bills; (ii) fewer outstanding invoices; (iii) improved consumer bill-pay experience; and (iv) increased security and lower fraudulent payment rates because the consumer is pre-authenticated in the CFI payment platform. User 108 benefits may include: (i) additional credit card points or other loyalty points because user 108 can use their transaction card to pay more bills; (ii) enhanced consumer experience due to improved payment choices and simplified bill-payment processes; (iii) ability to access credit to pay bills; and (iv) increased confidence due to improved payment security and real-time confirmation messaging.

At least some communication channels and/or data exchange described herein, such as between various components of card-based bill payment network 100, may be implemented using an API ecosystem to enable direct data integration between those components. Moreover, the payment form on the website or app user interface of CFI 106 may be hosted by BPX computing system 102 and/or payment processing network 118 via an embedded form (e.g., a JAVASCRIPT library), to enable direct integration with BPX computing system 102 and/or payment processing network 118 (e.g., for data transmission, data tokenization, etc.).

FIG. 3 illustrates an example bill payment user interface 302 within a CFI bill payment environment 300, in accordance with the present disclosure. Bill payment user interface 302 may be presented to user 108 on a display of user computing device 116, and may be part of a website or a software app maintained by and/or associated with CFI 106 (e.g., "Your Bank"). CFI 106 may control the aesthetics (e.g., the "look and feel") of bill payment user interface 302.

In the illustrated embodiment, user 108 has selected (e.g., on a previous webpage or app screen) to pay a bill to MERCHANT XYZ, in a bill pay amount of $123.45. CFI 106 has determined that MERCHANT XYZ accepts credit card payments as payment options for bills. Specifically, MERCHANT XYZ accepts card types and/or schemes of A, B, and C. User 108 has selected "debit/credit card" as their preferred form of payment.

In response to the user's selection, a payment form 304 is provided to user 108 on bill payment user interface 302. BPX computing system 102 (and/or payment processing network 118, which may be associated with BPX computing system 102) may host payment form 304 as a form embedded on bill payment user interface 302 by CFI 106. In such embodiments, CFI 106 may still control the aesthetics of payment form 304, such that user 108 encounters a seamless user interface 302 and an uninterrupted payment experience, but payment form 304 is generated and communicatively coupled to BPX computing system 102 (and/or payment processing network 118). Accordingly, all data entered into payment form 304 may be provided directly to BPX computing system 102 (and/or payment processing network 118). Additionally or alternatively, when user 108 enters data into payment form 304, the data may be transmitted to CFI 106, which may transmit the data to BPX computing system 102 (and/or payment processing network 118), directly or after further processing and/or formatting.

Figure 4:
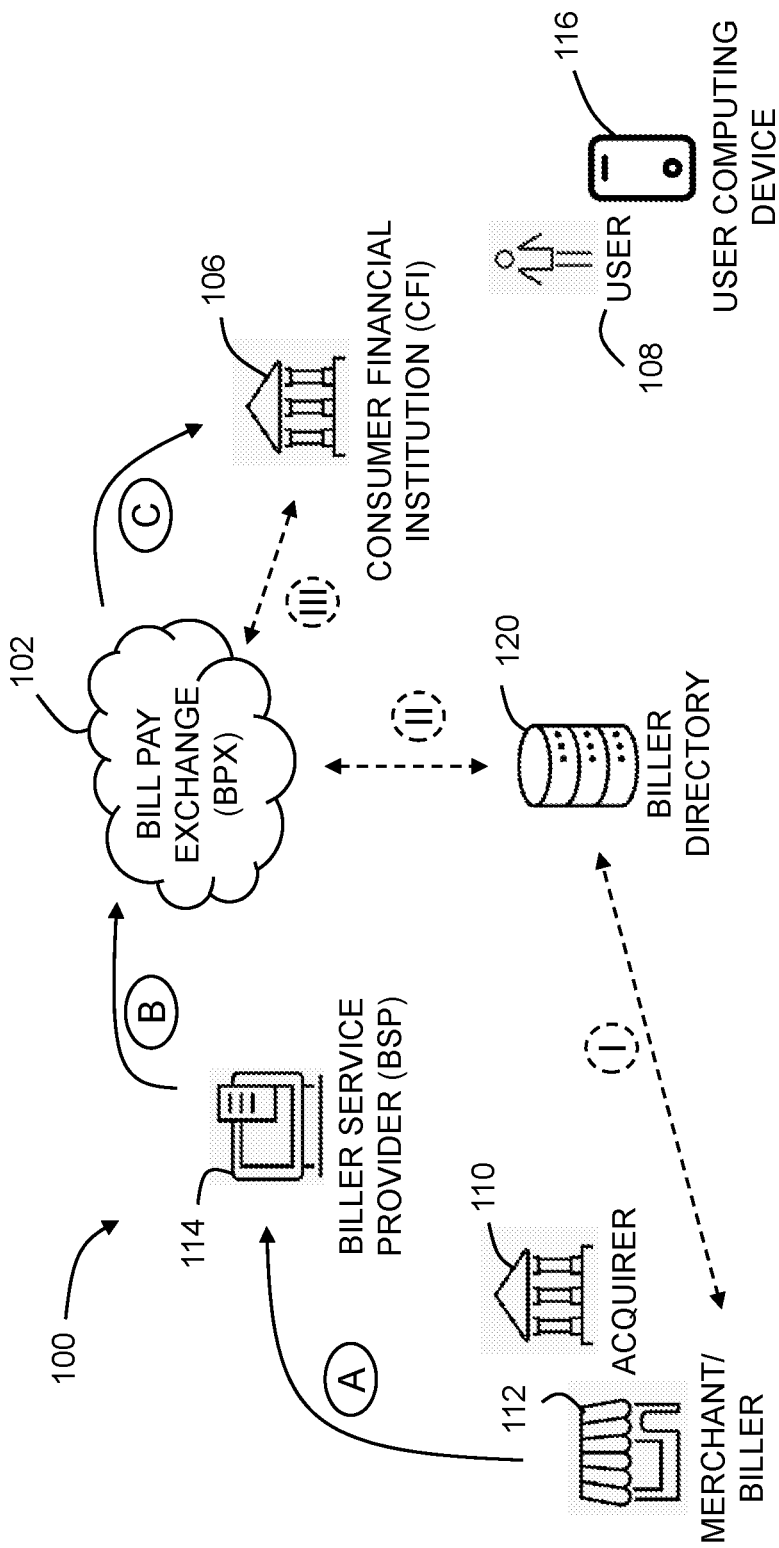

FIG. 4 depicts card-based bill payment network 100 shown in FIGS. 1 and 2 implementing initialization processes. Specifically, a bill submission process (steps (A)-(C)) and a directory sharing process (steps (I)-(III)) are illustrated.

To submit a bill for presentment to user 108, biller 110 transmits (A) bill data to BSP 114. The bill data includes a billed amount and consumer information that identifies user 108. Consumer information may include contact information, an account number or identifier, a user identifier, and/or any other suitable information. In some embodiments, as described further herein, biller 112 (and/or BSP 114, on behalf of biller 112) may already be linked to user 108, or, more specifically, to the user's account with CFI 106. Accordingly, biller 112 may provide consumer information including a linked consumer identifier created during this linking process that enables biller 112 (and/or BSP 114, on behalf of biller 112) to directly identify user 108 through CFI 106. BSP 114 may transmit (B) the bill data to BPX computing system 102 for transmission (C) to CFI 106 based on the consumer information. The bill data is available to user 108 via the CFI payment platform, which may be accessed, for example, using user computing device 116.

Turning to the directory sharing process, BPX computing system 102 includes or has access to a biller directory 120. Biller directory 120 stores records associated with a plurality of billers 112. These biller records include biller information, including biller IDs and associated BSP IDs. The biller records also include biller preferences, including whether a biller accepts transaction cards as payment options and, if so, what card schemes and/or card types are accepted by the biller. The biller preferences may also indicate whether the biller charges a transaction fee for using a transaction card as a form of payment, and whether that transaction fee is flat fee or a percentage of a billed/paid amount. Additional information in biller records accessible to CFI 106 may include, for example, a biller name and/or short name, biller class code/description, currency, effective/live date of any biller preferences or records changes/updates, estimated posting hours, biller logo, biller terms and conditions, and biller messaging details (e.g., service type, connectivity type). Biller records may be updated periodically and/or in response to a biller 112 transmitting (I) new or updated biller information or biller preferences. The biller records are stored at biller directory and are collectively referred to as a "directory file."

On a regular, periodic basis (e.g., every day, every other day, every week, etc.), BPX computing system 102 accesses biller directory 120 to retrieve (II) the directory file. In one or more alternative embodiments, BPX computing system 102 only accesses biller directory 120 to retrieve (II) the directory file when the directory file is updated. BPX computing system 102 transmits (III) the directory file to CFI 106. CFI 106 receives the directory file and stores at least a portion of the data therein. In particular, CFI 106 stores biller IDs, BSP IDs, and biller preferences. Accordingly, when a user 108 initiates a bill payment transaction, CFI 106 retrieves biller information and preferences associated with a biller 112 to determine what payment options to present to user 108 (e.g., within payment interface 302, shown in FIG. 3). In cases where biller 112 charges a transaction fee, CFI 106 may be responsible for calculating and charging that fee to user 108 at the time of bill payment.

Figure 5:
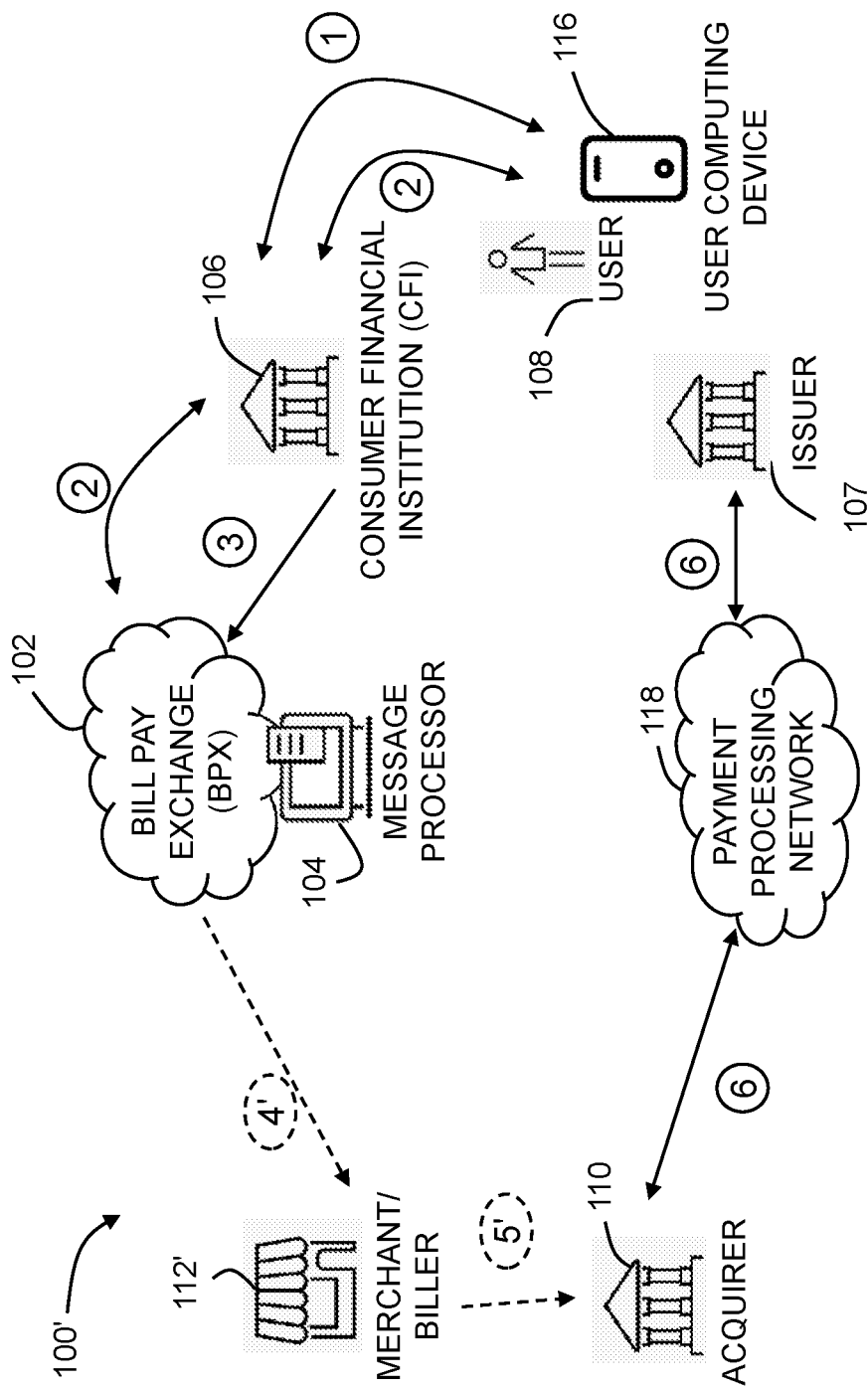
Figure 6:
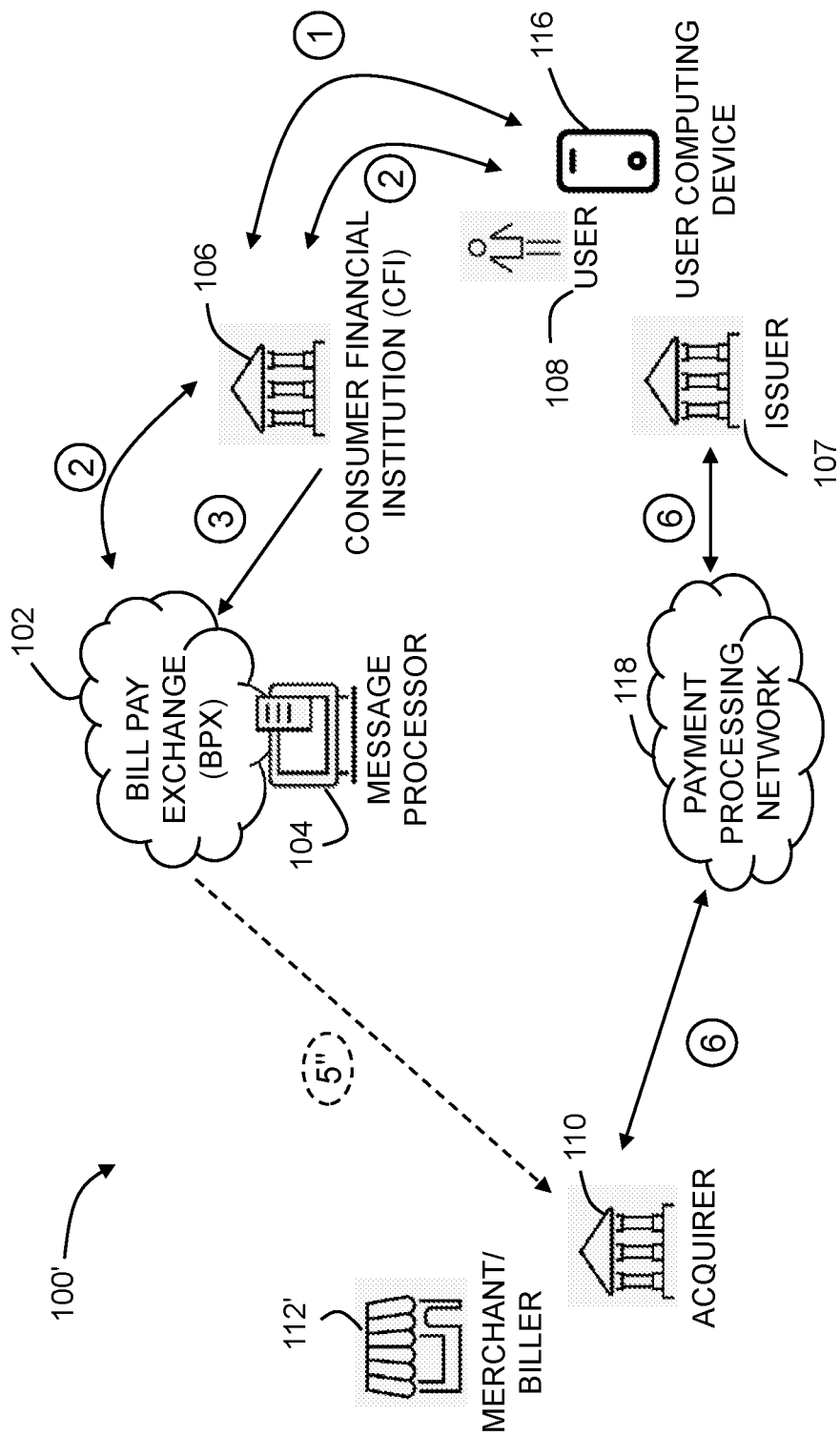

FIGS. 5 and 6 depict alternative examples of a card-based bill payment network 100' implementing a portion of the bill-payment method shown in FIG. 1. Card-based bill payment network 100' is substantially the same as card-based bill payment network 100 shown in FIG. 1. However, in the illustrated embodiment, a biller 112' is a large, national biller and performs its own billing services internally (i.e., without the use of an external BSP). Accordingly, the bill payment method described with respect to FIGS. 1 and 2 proceeds in substantially the same manner, except that BPX computing system 102 determines the biller identified by the biller ID in the payment initiation message is a large biller 112'. BPX computing system 102 therefore transmits (4') the payment initiation message directly to biller 112'. Biller 112' initiates authorization (5') of the bill payment transaction with acquirer 110 on its own behalf.

In yet another alternative embodiment, as shown in FIG. 6, BPX computing system 102 may store account credentials for large biller 112', the account credentials associated with a financial account of large biller 112' with their acquirer 110. In some such embodiments, BPX computing system 102 may receive (3) the payment initiation message from CFI 106, access the account credentials for large biller 112', and directly initiate authorization (5") of the bill payment transaction with acquirer 110.

Figure 7A:
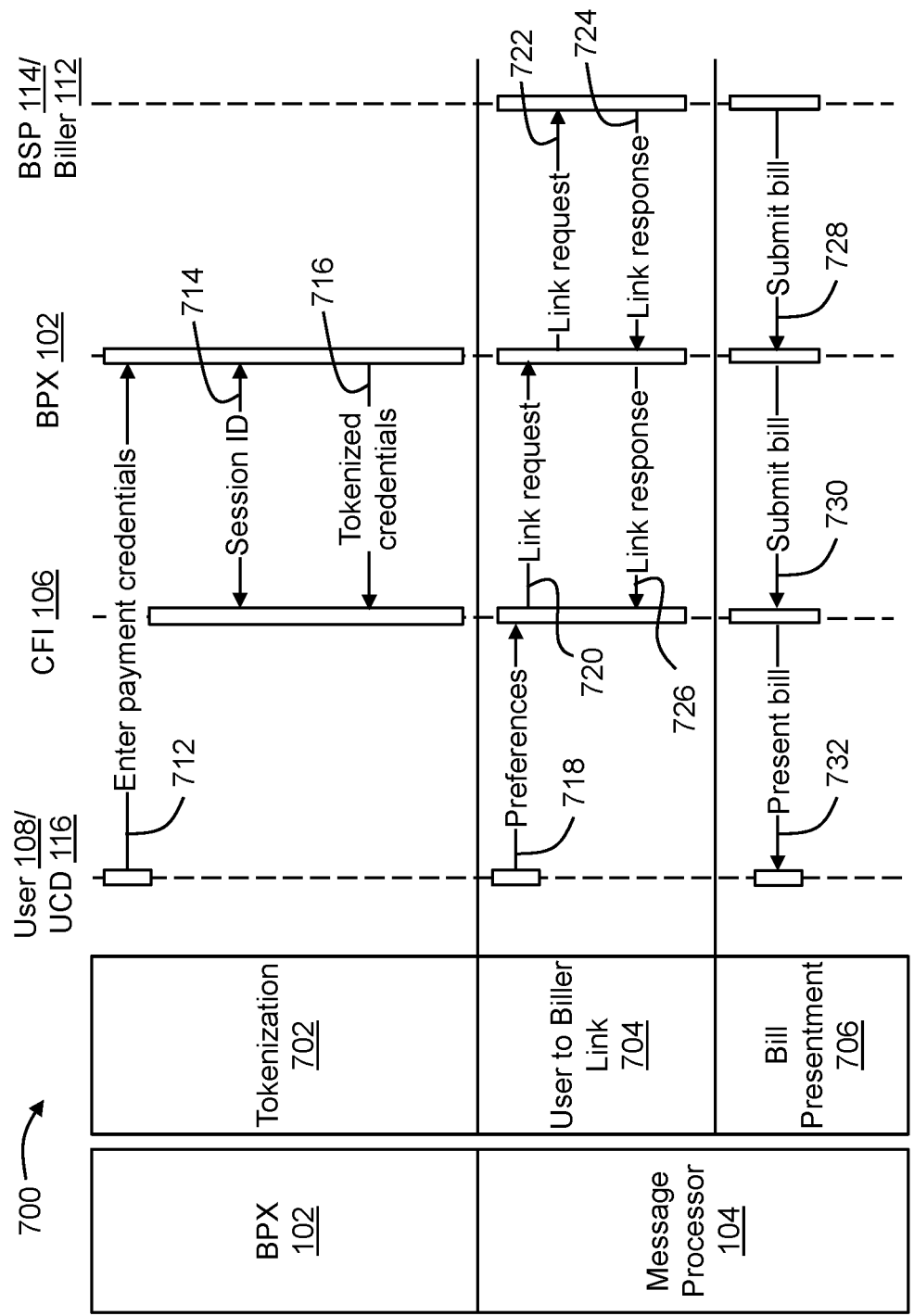
FIGS. 7A and 7B are a swim lane diagram illustrating implementation of a card-based bill payment method using components of the card-based bill payment network shown in FIG. 1.
Figure 7B:
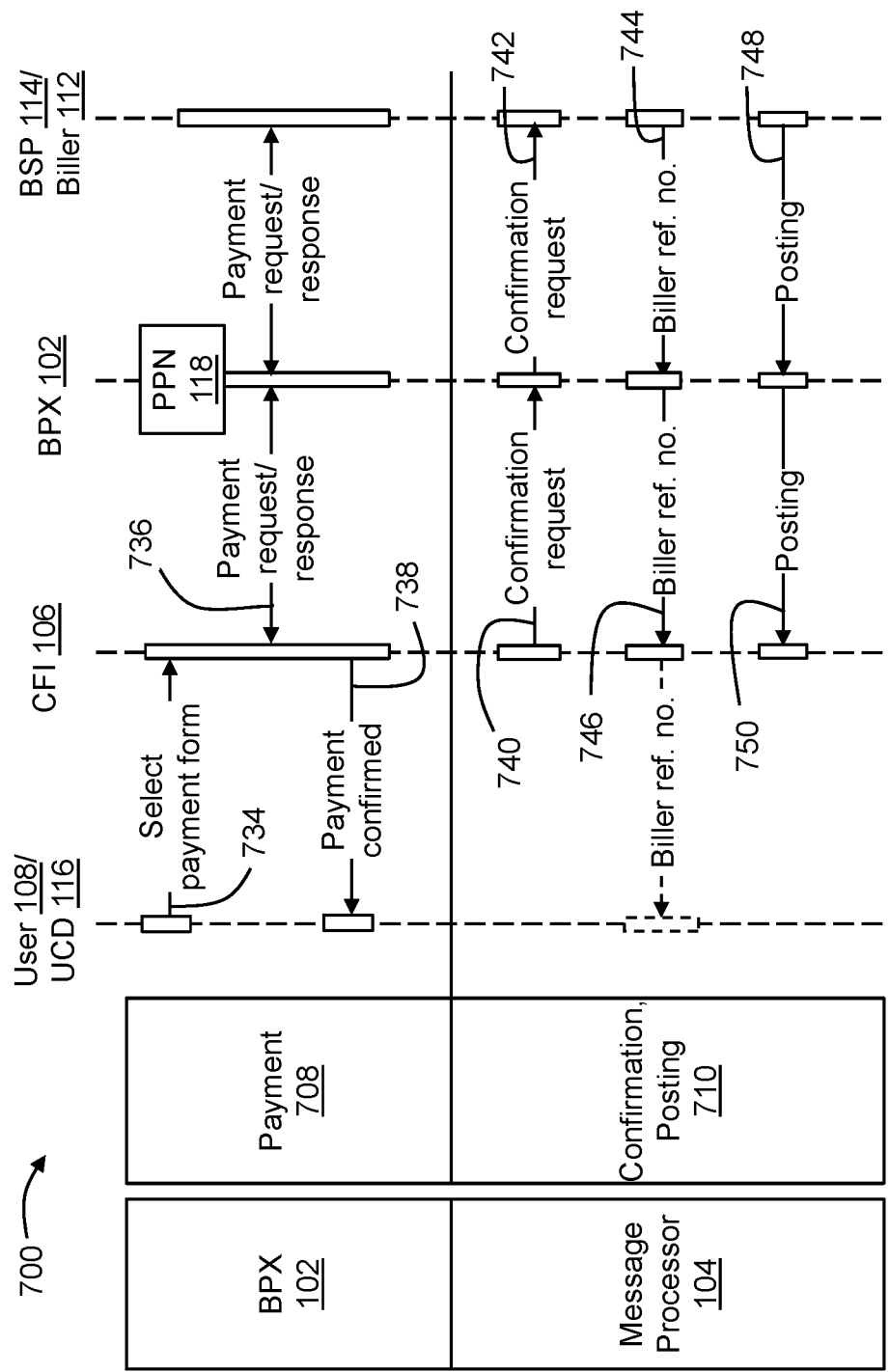

FIGS. 7A and 7B are a swim lane diagram illustrating an example portion of the card-based bill payment process 700 implemented using components of card-based bill payment network 100 shown in FIG. 1. In the example embodiment, process 700 includes several stages, including a tokenization stage 702, a biller-consumer linking stage 704, a bill presentment stage 706, a bill payment stage 708, and a confirmation and posting stage 710.

In tokenization stage 702, a user (e.g., user 108) provides 712 payment credentials (e.g., as user input to user computing device 116) associated with a transaction card (e.g., a credit card, debit card, etc.). As described herein, user 108 may provide 712 their payment credentials in a payment form that is directly integrated to BPX computing system 102 (and/or payment processing network 118). In such cases, tokenization stage 702 may occur directly before user 108 initiates a bill payment transaction using a transaction card. Alternatively, tokenization stage 702 may occur at some other point in time before user 108 initiates a bill payment transaction. Accordingly, in some such cases, user 108 provides 712 their payment credentials in a non-payment form, such as a payment option registration form. The payment option registration form may also be directly integrated to BPX computing system 102 (and/or payment processing network 118).

In the example embodiment, when user 108 provides 712 their payment credentials, as part of a tokenization request, the payment credentials are transmitted directly to BPX computing system 102 (and/or payment processing network 118). BPX computing system 102 (and/or payment processing network 118) captures the payment credentials and generates a session ID. BPX computing system 102 (and/or payment processing network 118) and CPI 106 exchange 714 the session ID via an API integration. An example tokenization request may include:

```
{
    "sourceOfFunds": {
        "type": "CARD",
        "provided": {
            "card": {
                "expiry": {
                    "month": 1,
                    "year": 22
                },
                "number": "5123450000000008",
                "securityCode": "362"
            }
        }
    }
}
```

BPX computing system 102 (and/or payment processing network 118) returns 716 a response including tokenized payment credentials. The response may include additional data elements, such as a card type of the associated transaction card, a card scheme (e.g., MASTERCARD, VISA, etc.), and/or a non-tokenized portion of the payment credentials (e.g., for verification), such as a first four digits and/or a last four digits of a card number of the transaction card. An example tokenization response may include, for example:

```
{
    "repositoryId": "TESTCFITOKENS",
    "response": {
        "gatewayCode": "BASIC_VERIFICATION_SUCCESSFUL"
    },
    "result": "SUCCESS",
    "sourceOfFunds": {
        "provided": {
            "card": {
                "brand": "MASTERCARD",
                "expiry": "0521",
                "fundingMethod": "CREDIT",
                "issuer": "BANCO DEL PICHINCHA, C.A.",
                "number": "512345xxxxxx0008",
                "scheme": "MASTERCARD"
            }
        },
        "type": "CARD"
    },
    "status": "VALID",
    "token": "9562613755722189",
    "usage": {
        "lastUpdated": "2019-10-08T17:55:33.405Z",
        "lastUpdatedBy": "TESTBPXCFI010019",
        "lastUsed": "2019-10-07T20:45:14.649Z"
    },
    "verificationStrategy": "BASIC"
}
```

In at least some embodiments, CFI 106 stores the tokenized payment credentials and/or any other information from the response, such that user 108 may select pre-stored tokenized payment credentials to use in a subsequent bill-pay transaction.

In some embodiments of tokenization stage 702, BPX computing system 102 receives a batch file including consolidated user card information. In such cases, BPX computing system 102 may tokenize the received consolidated user card information and transmit a batch response file to CFI 106. The batch response file includes tokenized payment credentials, a card type, a masked card number, and card scheme information. CFI 106 may store the batch response file and/or information therein for use in one or more future bill payment transactions initiated by the user with the transaction card (e.g., such that user 108 may select pre-stored tokenized payment credentials).

When user 108 accesses CFI 106 to make bill payment through a payment platform of CFI 106, in some embodiments, a biller-consumer linking stage 704 of process 700 is conducted. In biller-consumer linking stage 704, user 108 provides 718 their payment preferences, such as a preferred default payment option (e.g., transaction card vs. bank account, a first transaction card vs. a second transaction card, etc.), for payment of a particular bill. CFI 106 transmits 720 a request to link user 108 to biller 112 (and/or BSP 114) for payment of the bill. The request may include security answers to security questions, a bill reference number, a user identifier (e.g., an account number of an account that user 108 maintains with biller 112), and/or the user's tokenized payment credentials corresponding to the user's payment preferences. BPX computing system 102 (e.g., message processor 104) receives the transmitted (720) request. BPX computing system 102 (e.g., message processor 104) may process the transmitted (720) request to identify the intended biller/BSP recipient. BPX computing system 102 (e.g., message processor 104) may append additional data onto the request, such as the tokenized payment credentials corresponding the user's payment preferences, a link reference number, and the like, where such data was not includes in the request transmitted (720) by CFI 106. BPX computing system 102 (e.g., message processor 104) forwards 722 the request onto the biller 112/BSP 114.

Biller 112/BSP 114 receives the request and may locally store data from the request. In some embodiments, biller 112/BSP 114 stores the tokenized payment credentials for future use (e.g., for automatic future payments). Biller 112/BSP 114 generates and transmits 724 a response to the linking request, such as an affirmative response. BPX computing system 102 (e.g., message processor 104) receives the transmitted (724) response, identifies CFI 106 as the intended recipient, and forwards 726 the response to CFI 106 to complete the user-biller link. This link validates, in real time, user's account information to biller 112/BSP 114. The link also enables biller 112/BSP 114 to send messages to user 108 via CFI 106 (e.g., using message processor 104), such as bill payment reminders. Once user 108 is authenticated with biller 112/BSP 114 via this linking stage 704, user 108 may easily receive electronic bills (eBills) from biller 112/BSP 114 and make payments thereof through the CFI's payment environment. CFI 106 may store the user's tokenized payment credentials corresponding to the user's payment preferences, such that these credentials will be automatically used for any subsequent payments (e.g., one-time payments, scheduled payments, auto-payments, etc.), unless alternative payment credentials are requested to be used by user 108.

Bill presentment stage 706 may occur before or after linking stage 704, or linking stage 704 may not be performed at all. Biller 112/BSP 114 submits 728 a bill for payment to BPX computing system 102. The bill includes bill data, such as a billed amount, biller/BSP account details (e.g., account credentials for a payment account with acquirer 110, shown in FIG. 1), and/or payment clearing/settlement options. BPX computing system 102 receives the submitted (728) bill, identifies CFI 106 as the intended recipient, and forwards 730 the bill to CFI 106. CFI 106 presents 732 the bill to user 108 (e.g., through a user interface of the CFI's payment platform).

In payment stage 708, user 108 selects 734 their preferred form of payment to pay a bill (e.g., a bill presented (732) to user 108 by CFI 106). In some embodiments, user 108 selects 734 stored payment credentials. CFI 106 uses the selected payment credentials to initiate a payment authorization sub-process 736 conducted between issuer 107 of the transaction card used to initiate the bill payment transaction (which may include CFI 106 or may be a different financial institution), BPX computing system 102 and/or payment processing network 118, and biller 112/BSP 114 (and/or acquirer 110). For example, CFI 106 generates a payment initiation request that is transmitted to and processed by BPX computing system 102 (and/or payment processing network 118). The payment initiation request includes, for example, the payment credentials selected by user 108, a bill payment amount, a biller ID, a CFI ID (associated with CFI 106 itself), a BSP ID, an indicator of whether fees are being paid, etc. An example payment initiation request includes, for example:

```
{
        "apiOperation":"PAY",
    "sourceOfFunds": {
        "type": "CARD",
        "token":"9562613755722189"
    },
    "order": {
        "amount": 77.53,
        "currency":"USD",
        "surchargeAmount":7.53,
        "custom":{
            "billerID":"3737373700"
        },
        "customerReference":"multiple_dss_ms3_03",
        "statementDescriptor":{
            "name":"Test MOD-CIE Biller"
        }
    },
    "lineOfBusiness": "000668",
    "customer": {
        "firstName": "John",
        "lastName": "Smith"
    }
}
```

The payment initiation request is processed by BPX computing system 102 (and/or payment processing network 118) and forwarded to the appropriate BSP 114. BSP 114 generates an authorization request on behalf of biller 112, and authorization proceeds as normal (e.g., using payment processing network 118 to implement authorization). For example, issuer 107 of the transaction card (which may include CFI 106) authorizes the bill payment transaction.

In the example embodiment, upon completion of the payment authorization sub-process 736, CFI 106 presents 738 a confirmation message to user 108 indicating that the bill payment was successfully authorized. Where CFI 106 is not the issuer of the transaction card, CFI 106 may receive a message indicating the bill payment transaction was authorized, and subsequently present 738 the confirmation message. In one embodiment, CFI 106 receives the message indicating the bill payment transaction was successfully authorized and completed from BPX computing system 102 (e.g., via the API connection between CFI 106 and BPX computing system 102). Such an "authorization complete" message may include, for example:

```
{
    "authorizationResponse": {
        "financialNetworkDate": "0616-01-01",
        "transactionIdentifier": "BNKNTRF89"
    },
    "customer": {
        "firstName": "John",
        "lastName": "Smith"
    },
    "gatewayEntryPoint": "AUTO",
    "lineOfBusiness": "000668",
    "merchant": "TESTBPXCFI010019",
    "order": {
        "amount": 77.53,
        "chargeback": {
            "amount": 0,
            "currency": "USD"
        },
        "creationTime": "2019-10-08T17:58:45.918Z",
        "currency": "USD",
        "custom": {
            "billerID": "3737373700"
        },
        "customerReference": "multiple_dss_ms3_03",
        "id": "TestOrder3",
        "merchantCategoryCode": "6051",
        "netAmount": 70.00,
        "statementDescriptor": {
            "name": "Test MOD-CIE Biller"
        },
        "status": "CAPTURED",
        "surchargeAmount": 7.53,
        "surchargeSource": "CLIENT",
        "totalAuthorizedAmount": 77.53,
        "totalCapturedAmount": 77.53,
        "totalRefundedAmount": 0.00
    },
    "response": {
        "acquirerCode": "",
        "acquirerMessage": "",
        "gatewayCode": "APPROVED"
    },
    "result": "SUCCESS",
    "sourceOfFunds": {
        "provided": {
            "card": {
                "brand": "MASTERCARD",
                "expiry": {
                    "month": "5",
                    "year": "21"
                },
                "fundingMethod": "CREDIT",
                "issuer": "BANCO DEL PICHINCHA, C.A.",
                "number": "512345xxxxxx0008",
                "scheme": "MASTERCARD"
            }
        },
        "token": "9562613755722189",
        "type": "CARD"
    },
    "timeOfRecord": "2019-10-08T17:58:46.071Z",
```

-continued

```
"transaction": {
    "acquirer": {
        "batch": 1,
        "id": "FIRSTDATA",
        "merchantId": "123456",
        "transactionId": "TestOrder3"
    },
    "amount": 77.53,
    "authorizationCode": "100000",
    "currency": "USD",
    "frequency": "SINGLE",
    "id": "TestTransaction6",
    "receipt": "1910088",
    "source": "INTERNET",
    "taxAmount": 0.00,
    "terminal": "ABC123",
    "type": "CAPTURE"
},
"version": "53"
}
```

Confirmation and posting stage 710 occurs in real-time immediately after payment stage 708 is completed. Specifically, in confirmation and posting stage 710, CFI 106 generates a payment confirmation request that includes remittance information associated with the authorized bill payment. Remittance information may include, for example, a representation of the payment credentials used to conduct the bill payment transaction (e.g., a masked FPAN, last 4 digits of PAN, etc.), the bill payment amount, whether any fees were paid, a transaction ID associated with the authorized bill payment transaction, a timestamp, and a card network authorization ID. CFI 106 transmits 740 the confirmation request to BPX computing device 102 (e.g., message processor 104). BPX computing device 102 (e.g., message processor 104) receives the confirmation request and identifies the intended recipient. BPX computing device 102 (e.g., message processor 104) transmits 742 the confirmation request with the remittance information to biller 112/BSP 114.

BSP 114 updates the ERP system of biller 112 to indicate the bill has been paid. Biller 112/BSP 114 returns 744 a confirmation response including a biller reference number associated with the paid bill. The biller reference number may include and/or be associated with the transaction ID, or may be completely separate and different from the transaction ID. BPX computing system 102 (e.g., message processor 104) receives the confirmation response, identifies the intended recipient, and forwards 746 the confirmation response including the biller reference number to CFI 106. CFI 106 may present the confirmation response including the biller reference number to user 108.

In addition, biller 112/BSP 114 generates and transmits 748 posting information to initiate clearing/settlement of the bill payment transaction with CFI 106. BPX computing system 102 (e.g., message processor 104) receives the posting information, identifies the intended recipient, and forwards 750 the posting information to CFI 106. CFI 106 may send an acknowledgement message back to biller 112/BSP 114 via BPX computing system 102 (e.g., message processor 104).

Figure 8:
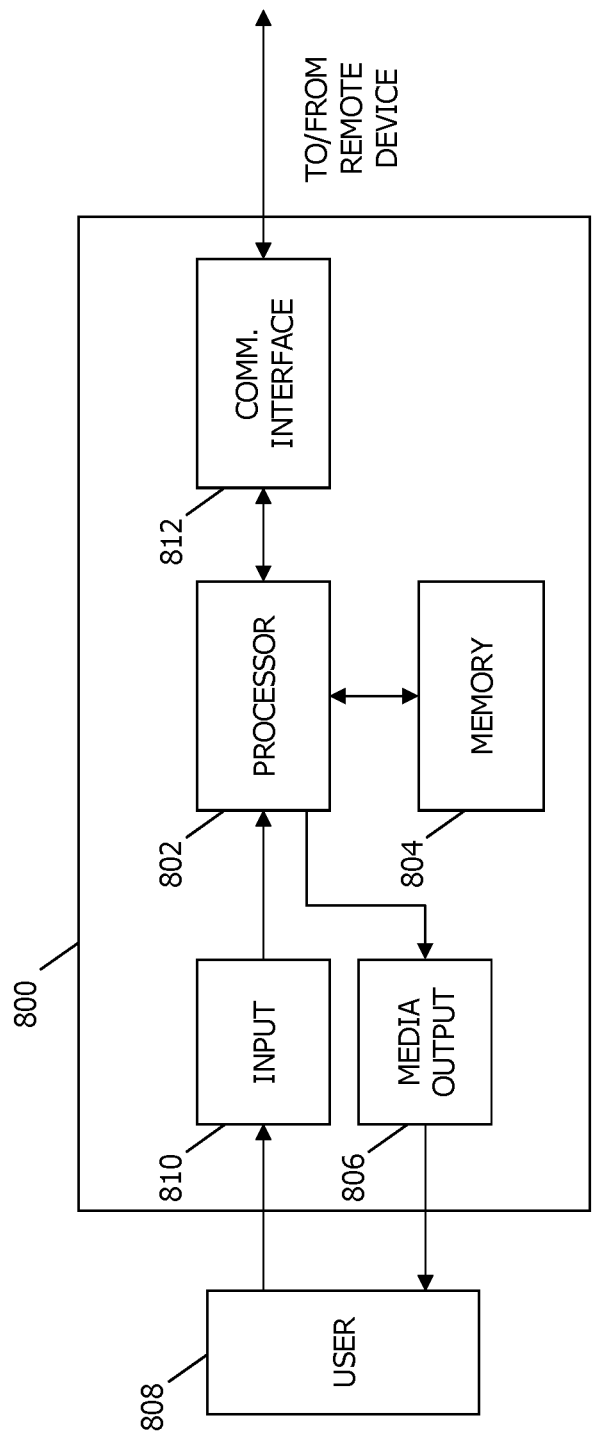

FIG. 8 illustrates an example configuration of a user system 800, such as user computing device 116 of user 108 (both shown in FIG. 1). In the example embodiment, user system 800 includes a processor 802 for executing instructions. In some embodiments, executable instructions are stored in a memory area 804. Processor 802 may include one or more processing units, for example, a multi-core configuration. Memory area 804 is any device allowing information such as executable instructions and/or written works to be stored and retrieved. Memory area 804 may include one or more computer readable media.

User system 800 also includes at least one media output component 806 for presenting information to a user 808 (e.g., user 108). Media output component 806 is any component capable of conveying information to user 808. For example, media output component 806 may be a display component configured to display payment platform(s). In some embodiments, media output component 806 includes an output adapter such as a video adapter and/or an audio adapter. An output adapter is operatively coupled to processor 802 and operatively connectable to an output device such as a display device, a liquid crystal display (LCD), organic light emitting diode (OLED) display, or "electronic ink" display, or an audio output device, a speaker or headphones.

In some embodiments, user system 800 includes an input device 810 for receiving input from user 808. Input device 810 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 806 and input device 810. User system 800 may also include a communication interface 812, which is communicatively connectable to a remote device (e.g., a computer of CFI 106, shown in FIG. 1). Communication interface 812 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 804 are, for example, computer readable instructions for providing a user interface to user 808 via media output component 806 and receiving and processing input from input device 810. A user interface may include, among other possibilities, a web browser and client application ("app"). Web browsers enable users, such as user 808, to display and interact with media and other information typically embedded on a web page or a website.

Figure 9:
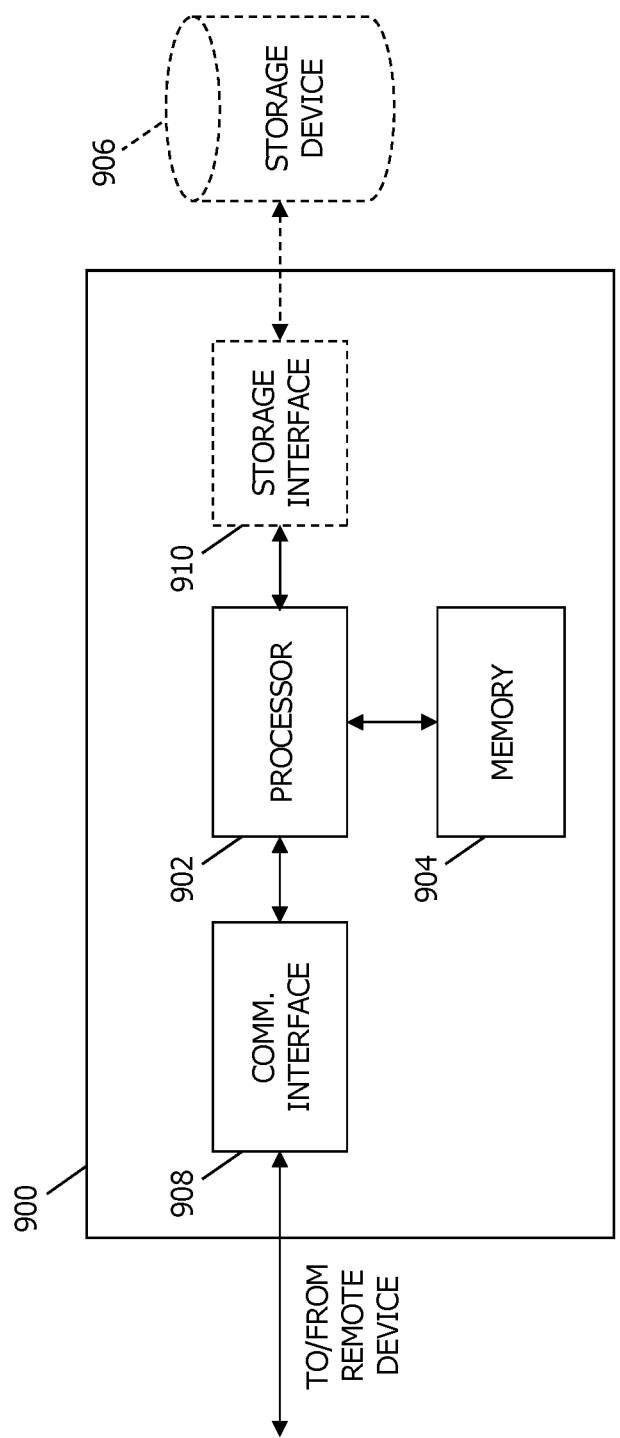

FIG. 9 shows an example configuration of a server system 900. Server system 900 may include, but is not limited to, BPX 102, message processor 104, CFI 106, acquirer 110, biller 112, BSP 114, payment processing network 118 (all shown in FIG. 1), and/or computing device(s) associated with any party to card-based bill payment system 100 (also shown in FIG. 1).

Server system 900 includes a processor 902 for executing instructions. Instructions may be stored in a memory area 904, for example. Processor 902 may include one or more processing units (e.g., in a multi-core configuration) for executing instructions. The instructions may be executed within a variety of different operating systems on server system 900, such as UNIX, LINUX, Microsoft Windows®, etc. More specifically, the instructions may cause various data manipulations on data stored in memory 904 and/or in a storage device 906 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 902 is operatively coupled to a communication interface 908 such that server system 900 is capable of communicating with a remote device such as a user system 800 (shown in FIG. 8) or another server system 900. Processor 902 may also be operatively coupled to storage device 906. Storage device 906 is any computer-operated hardware suitable for storing and/or retrieving data. In some embodiments, storage device 906 is integrated in server system 900. In other embodiments, storage device 906 is external to server system 900. For example, server system 900 may include one or more hard disk drives as storage device 906. In other embodiments, storage device 906 is external to server system 900 and may be accessed by a plurality of server systems 900. For example, storage device 906 may include multiple storage units such as hard disks or solid state disks in a redundant array of inexpensive disks (RAID) configuration. Storage device 906 may include a storage area network (SAN) and/or a network attached storage (NAS) system.

In some embodiments, processor 902 is operatively coupled to storage device 906 via a storage interface 910. Storage interface 910 is any component capable of providing processor 902 with access to storage device 906. Storage interface 910 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 902 with access to storage device 906.

Memory area 904 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 10:
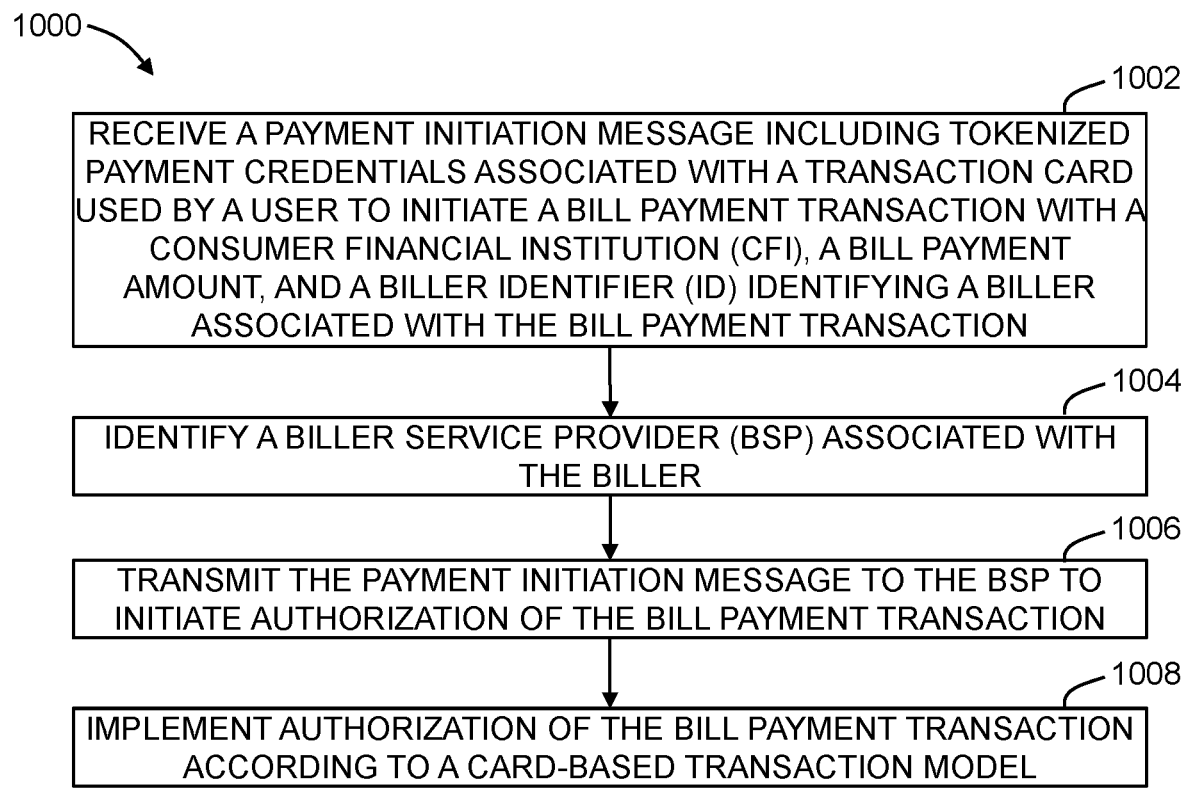

FIG. 10 is an example flow diagram illustrating a method 1000 for card-based bill payment. Method 1000 may be implemented using one or more components of card-based bill payment system 100 (shown in FIG. 1) and/or card-bill payment bill payment system 100' (shown in FIGS. 5 and 6).

In the example embodiment, method 1000 includes receiving 1002, by a bill pay exchange (BPX) computing system (e.g., BPX computing system 102), a payment initiation message from a consumer financial institution (CFI, e.g., CFI 106). The payment initiation message includes tokenized payment credentials associated with a transaction card used by a user (e.g., user 108) to initiate a bill payment transaction with the CFI, a bill payment amount, and a biller identifier (ID) identifying a biller (e.g., biller 112, all shown in FIG. 1) associated with the bill payment transaction.

Method 1000 also includes identifying 1004, by the BPX computing system, a biller service provider (BSP, e.g., BSP 114, also shown in FIG. 1) associated with the biller, and transmitting 1006, by the BPX computing system, the payment initiation message to the BSP to initiate authorization of the bill payment transaction.

Method 100 further includes implementing 1008, by a payment processing network (e.g., payment processing network 118, also shown in FIG. 1) associated with the BPX computing system, authorization of the bill payment transaction according to a card-based transaction model (e.g., a four-party card-based transaction model). Implementing 1008 includes transmitting an authorization request to and receiving an authorization response including an approval from an issuer of the transaction card (e.g., issuer 107, should in FIG. 1, which may include the CFI).

As will be appreciated based on the foregoing specification, the above-described embodiments of the disclosure may be implemented using computer programming or engineering techniques including computer software, firmware, hardware or any combination or subset thereof, wherein the technical effect is to enable the use of transaction cards for bill payment within a consumer financial institution payment platform. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A card-based bill payment system enabling bill payment using a transaction card within a consumer financial institution (CFI) payment platform, the bill payment system comprising:
   a bill pay exchange (BPX) computing system comprising at least one first processor communicatively coupled to at least one first memory device and a messaging processor, the BPX computing system configured to:
      receive a payment initiation message from a CFI, the payment initiation message formatted according to a first standard for exchanging electronic messages between financial institutions and including tokenized payment credentials associated with a transaction card used by a user to initiate a bill payment transaction with the CFI, a bill payment amount, and a biller identifier (ID) identifying a biller associated with the bill payment transaction;

identify a biller service provider (BSP) associated with the biller; and transmit the payment initiation message to the BSP to initiate authorization of the bill payment transaction with an acquirer of the biller; and a payment processing network associated with the BPX computing system, the payment processing network comprising a plurality of second processors and a plurality of second memory devices, the payment processing network configured to:

receive an authorization request for authorization of the bill payment transaction from the acquirer of the biller; and implement the authorization of the bill payment transaction according to a card-based transaction model, including transmitting the authorization request to and receiving an authorization response including an approval from an issuer of the transaction card used to initiate the bill payment transaction, wherein the authorization request and the authorization response are formatted according to the first standard for exchanging electronic messages between financial institutions, wherein the BPX computing system is further configured to:

upon completion of the authorization of the bill payment transaction, receive, via the messaging processor, a payment confirmation from the CFI indicating approval of the bill payment transaction;

transmit, via the messaging processor, the payment confirmation message to the BSP;

receive, via the messaging processor, a confirmation receipt including a biller reference number from the BSP; and transmit, via the messaging processor, the confirmation receipt to the CFI for display to the user through the CFI payment platform.

2. The card-based bill payment system of claim 1, wherein the BPX computing system is further configured to:

provide an embedded payment form that is hosted by the BPX computing system within a user interface of the CFI payment platform;

receive user input to the payment form, the user input including non-tokenized payment credentials for the transaction card;

tokenize the payment credentials to generate the tokenized payment credentials; and transmit the tokenized payment credentials for storage at the CFI.

3. The card-based bill payment system of claim 1, wherein the payment initiation message further includes a BSP ID, and wherein to identify the BSP associated with the biller for routing the payment initiation message to the BSP, the BPX computing system is further configured to parse the payment initiation message for the BSP ID.

4. The card-based bill payment system of claim 1, further comprising a biller directory that stores biller preferences including accepted payment options for a plurality of billers, wherein the BPX computing system is further configured to transmit the biller preferences to the CFI for local storage at the CFI.

5. The card-based bill payment system of claim 1, wherein the BPX computing system is further configured to:

receive a bill request from the BSP, the bill request including bill data associated with the bill and generated by the biller; and transmit the bill request to the CFI for presentment to the user.

6. The card-based bill payment system of claim 1, wherein the payment initiation message further includes a bill identifier (ID) associated with a bill to be paid during the bill pay transaction.

7. The card-based bill payment system of claim 1, wherein the BPX computing system is further configured to:

receive a batch card information file including consolidating user card information associated with the transaction card; and transmit, to the CFI, a batch response file including tokenized payment credentials, a card type, a masked card number, and card scheme information for use by the CFI in one or more future bill payment transactions initiated by the user with the transaction card.

8. The card-based bill payment system of claim 1, wherein the plurality of second processors comprises the at least one first processor.

9. A computer-implemented method for bill payment using a transaction card within a consumer financial institution (CFI) payment platform, the method comprising:

receiving, by a bill pay exchange (BPX) computing system comprising at least one first processor communicatively coupled to at least one first memory device and a messaging processor, a payment initiation message from a CFI, the payment initiation message formatted according to a first standard for exchanging electronic messages between financial institutions and including tokenized payment credentials associated with a transaction card used by a user to initiate a bill payment transaction with the CFI, a bill payment amount, and a biller identifier (ID) identifying a biller associated with the bill payment transaction;

identifying, by the BPX computing system, a biller service provider (BSP) associated with the biller;

transmitting, by the BPX computing system, the payment initiation message to the BSP to initiate authorization of the bill payment transaction with an acquirer of the biller; and receiving, by a payment processing network associated with the BPX computing device, an authorization request for authorization of the bill payment transaction from the acquirer of the biller, wherein the payment processing network comprises a plurality of second processors and a plurality of second memory devices;

implementing, by the payment processing network, the authorization of the bill payment transaction according to a card-based transaction model, including transmitting the authorization request to and receiving an authorization response including an approval from an issuer of the transaction card used to initiated the bill payment transaction, wherein the authorization request and the authorization response are formatted according to the first standard for exchanging electronic messages between financial institutions;

upon completion of the authorization of the bill payment transaction, receiving, via the messaging processor of the BPX computing system, a payment confirmation from the CFI indicating approval of the bill payment transaction;

transmitting, via the messaging processor, the payment confirmation message to the BSP;

receiving, via the messaging processor, a confirmation receipt including a biller reference number from the BSP; and transmitting, via the messaging processor, the confirmation receipt to the CFI for display to the user through the CFI payment platform.

10. The computer-implemented method of claim 9, further comprising:

providing, by the BPX computing system, an embedded payment form that is hosted by the BPX computing system within a user interface of the CFI payment platform;

receiving, by the BPX computing system, user input to the payment form, the user input including non-tokenized payment credentials for the transaction card;

tokenizing, by the BPX computing system, the payment credentials to generate the tokenized payment credentials; and transmitting, by the BPX computing system, the tokenized payment credentials for storage at the CFI.

11. The computer-implemented method of claim 9, wherein the payment initiation message further includes a BSP ID, and identifying the BSP associated with the biller, for routing the payment initiation message to the BSP, comprises parsing the payment initiation message for the BSP ID.

12. The computer-implemented method of claim 9, further comprising:

accessing, by the BPX computing system, a biller directory that stores biller preferences including accepted payment options for a plurality of billers; and transmitting, by the BPX computing system, the biller preferences to the CFI for local storage at the CFI.

13. The computer-implemented method of claim 9, further comprising:

receiving, by the BPX computing system, a bill request from the BSP, the bill request including bill data associated with the bill and generated by the biller; and transmitting, by the BPX computing system, the bill request to the CFI for presentment to the user.

14. The computer-implemented method of claim 9, further comprising:

receiving, by the BPX computing system, a batch card information file including consolidating user card information associated with the transaction card; and transmitting, by the BPX computing system to the CFI, a batch response file including tokenized payment credentials, a card type, a masked card number, and card scheme information for use by the CFI in one or more future bill payment transactions initiated by the user with the transaction card.

15. The computer-implemented method of claim 9, wherein the plurality of second processors comprises the at least one first processor.

16. At least one non-transitory computer-readable storage medium having stored thereon computer-executable instructions, wherein, when the computer-executable instructions are executed by a processor of a bill pay exchange (BPX) computing system comprising at least one first processor communicatively coupled to at least one first memory device and a messaging processor, the computer-executable instructions cause the processor of the BPX computing system to:

receive a payment initiation message from a consumer financial institution (CFI), the payment initiation message formatted according to a first standard for exchanging electronic messages between financial institutions and including tokenized payment credentials associated with a transaction card used by a user to initiate a bill payment transaction with the CFI, a bill payment amount, and a biller identifier (ID) identifying a biller associated with the bill payment transaction;

identify a biller service provider (BSP) associated with the biller; and transmit the payment initiation message to the BSP to initiate authorization of the bill payment transaction with an acquirer of the biller;

wherein, when the computer-executable instructions are executed by a processor of a payment processor associated with the BPX computing system, the payment processor comprising a plurality of second processors and a plurality of second memory devices, the computer-executable instructions cause the processor of the payment processor to:

receive an authorization request for authorization of the bill payment transaction from the acquirer of the biller; and implement the authorization of the bill payment transaction according to a card-based transaction model, including transmitting the authorization request to and receiving an authorization response including an approval from an issuer of the transaction card used to initiate the bill payment transaction, wherein the authorization request and the authorization response are formatted according to the first standard for exchanging electronic messages between financial institutions; and wherein the computer-executable instructions further cause the messaging processor of the BPX computing system to:

upon completion of the authorization of the bill payment transaction, receive a payment confirmation from the CFI indicating approval of the bill payment transaction;

transmit the payment confirmation message to the BSP;

receive a confirmation receipt including a biller reference number from the BSP; and transmit the confirmation receipt to the CFI for display to the user through a payment platform of the CFI.

17. The at least one non-transitory computer-readable storage medium of claim 16, wherein the computer-executable instructions further cause the processor of the BPX computing system to:

provide an embedded payment form that is hosted by the BPX computing system within a user interface of the payment platform of the CFI;

receive user input to the payment form, the user input including non-tokenized payment credentials for the transaction card;

tokenize the payment credentials to generate the tokenized payment credentials; and transmit the tokenized payment credentials for storage at the CFI.

18. The at least one non-transitory computer-readable storage medium of claim 16, wherein the computer-executable instructions further cause the processor of the BPX computing system to:

access a biller directory that stores biller preferences including accepted payment options for a plurality of billers; and transmit the biller preferences to the CFI for local storage at the CFI.

19. The at least one non-transitory computer-readable storage medium of claim 16, wherein the computer-executable instructions further cause the processor of the BPX computing system to:
- receive a bill request from the BSP, the bill request including bill data associated with the bill and generated by the biller; and
- transmit the bill request to the CFI for presentment to the user.

20. The at least one non-transitory computer-readable storage medium of claim 16, wherein the payment initiation message further includes a bill identifier (ID) associated with a bill to be paid during the bill pay transaction.

21. The at least one non-transitory computer-readable storage medium of claim 16, wherein the computer-executable instructions further cause the processor of the BPX computing system to:
- receive a batch card information file including consolidating user card information associated with the transaction card; and
- transmit, to the CFI, a batch response file including tokenized payment credentials, a card type, a masked card number, and card scheme information for use by the CFI in one or more future bill payment transactions initiated by the user with the transaction card.

22. The at least one non-transitory computer-readable storage medium of claim 16, wherein the plurality of second processors comprises the at least one first processor.

* * * * *